(12) United States Patent
Petrovic et al.

(10) Patent No.: US 10,476,583 B2
(45) Date of Patent: Nov. 12, 2019

(54) MANAGED TIME DIVISION DUPLEXED BASEBAND SIGNALING

(71) Applicant: VIASAT, INC., Carlsbad, CA (US)

(72) Inventors: Branislav Petrovic, La Jolla, CA (US); Timothy J Martin, Carlsbad, CA (US); Christopher J Cronin, Monrovia, MD (US); Anthony G Hamel, Encinitas, CA (US); David L Terry, Frederick, MD (US)

(73) Assignee: VIASAT, INC., Carlsbad, CA (US)

( * ) Notice: Subject to any disclaimer, the term of this patent is extended or adjusted under 35 U.S.C. 154(b) by 534 days.

(21) Appl. No.: 15/077,089

(22) Filed: Mar. 22, 2016

(65) Prior Publication Data
US 2017/0047986 A1     Feb. 16, 2017

Related U.S. Application Data

(60) Provisional application No. 62/204,903, filed on Aug. 13, 2015.

(51) Int. Cl.
| | | |
|---|---|---|
| *H04B 7/185* | (2006.01) | |
| *H04L 5/14* | (2006.01) | |
| *H04L 5/00* | (2006.01) | |
| *H04L 25/49* | (2006.01) | |
| *H04L 27/00* | (2006.01) | |
| *H04L 1/00* | (2006.01) | |

(52) U.S. Cl.
CPC ....... *H04B 7/18513* (2013.01); *H04L 5/1469* (2013.01); *H04L 1/0001* (2013.01); *H04L 5/006* (2013.01); *H04L 25/49* (2013.01); *H04L 27/0008* (2013.01)

(58) Field of Classification Search
CPC ... H04B 7/18513; H04L 5/1469; H04L 5/006; H04L 27/0008; H04L 25/49
See application file for complete search history.

(56) References Cited

U.S. PATENT DOCUMENTS

| 6,466,607 B1 | 10/2002 | Chauncey et al. |
| 6,563,801 B2 | 5/2003 | Mäkinen et al. |
| 7,539,803 B2 | 5/2009 | Fischer et al. |

(Continued)

FOREIGN PATENT DOCUMENTS

| EP | 0114678 A2 | 8/1984 |
| EP | 1705824 A2 | 9/2006 |

(Continued)

OTHER PUBLICATIONS

International Search Report and Written Opinion mailed in International Application No. PCT/US2016/046384 dated Oct. 25, 2016, 14 pgs.

(Continued)

*Primary Examiner* — Anh Vu H Ly
*Assistant Examiner* — Hector Reyes

(57) ABSTRACT

The present disclosure relates to one or more techniques for communicating across multiple nodes using a single communication link. In certain embodiments, the nodes may be an indoor unit and an outdoor unit of a satellite user terminal for a satellite system. The multiple nodes may communicate with each other using a managed time division duplexed baseband signaling protocol over a single communication link.

27 Claims, 13 Drawing Sheets

(56) References Cited

U.S. PATENT DOCUMENTS

| | | | |
|---|---|---|---|
| 7,564,785 | B2 | 7/2009 | Krishnamurthi et al. |
| 7,639,598 | B2 | 12/2009 | Sovenyi |
| 7,752,365 | B2 | 7/2010 | Taylor et al. |
| 7,792,196 | B2 | 9/2010 | Sheiman et al. |
| 8,295,392 | B2 | 10/2012 | Teramoto |
| 8,406,709 | B2 | 3/2013 | Kushnir et al. |
| 8,693,342 | B2 | 4/2014 | Uyehara et al. |
| 8,787,345 | B2 | 7/2014 | Corbellini et al. |
| 9,071,410 | B2 | 6/2015 | Lee et al. |
| 2003/0030581 | A1* | 2/2003 | Roy ............ H04B 7/18508 342/36 |
| 2003/0152140 | A1 | 8/2003 | Antoniak |
| 2004/0229562 | A1 | 11/2004 | Wren et al. |
| 2006/0045038 | A1* | 3/2006 | Kay ............ H04B 7/18523 370/316 |
| 2006/0251115 | A1 | 11/2006 | Haque et al. |
| 2007/0293214 | A1 | 12/2007 | Ansari et al. |
| 2008/0151790 | A1 | 6/2008 | Lee et al. |
| 2010/0284323 | A1* | 11/2010 | Tang ............ H01Q 3/005 370/321 |
| 2014/0003307 | A1 | 1/2014 | Williams et al. |
| 2015/0215106 | A1 | 7/2015 | Dubrovin et al. |
| 2015/0264437 | A1 | 9/2015 | Biewer et al. |
| 2016/0191149 | A1* | 6/2016 | Jackson ............ H04B 7/18528 375/215 |

FOREIGN PATENT DOCUMENTS

| | | |
|---|---|---|
| WO | WO-2004/045125 A2 | 5/2004 |
| WO | WO-2008/043230 A1 | 4/2008 |
| WO | WO-2011/088774 A1 | 7/2011 |
| WO | WO-2013/108243 A1 | 7/2013 |
| WO | WO-2017/027612 A1 | 2/2017 |

OTHER PUBLICATIONS

Kern et al., "Bidirectional optical data transmission over a single multimode fiber", http://spie.org/x57249.xml, SPIE, Sep. 23, 2015, 4 pgs.

Texas Instruments, "DS90UB901Q/DS90UB902Q 10—43MHz 14 Bit Color FPD-Link III Serializer and Deserializer with Bidirectional Control Channel", www.ti.com/lit/gpn/ds90ub902q-q1, SNLS322E, Apr. 2013, 50 pgs.

Yeh et al., "Hybrid OFDM-based multi-band wireless and baseband signal transmission in PON access", IEEE, vol. 48, No. 7, Mar. 2012, pp. 390-392.

International Preliminary Report on Patentability mailed in International (PCT) Application No. PCT/US2016/046384 dated Feb. 22, 2018, 11 pgs.

\* cited by examiner

MANAGED TIME DIVISION DUPLEXED BASEBAND SIGNALING

CROSS REFERENCES TO RELATED APPLICATIONS

This application is a non-provisional application and claims the benefit and priority of U.S. Provisional Application No. 62/204,903, filed on Aug. 13, 2015, titled "TIME DIVISION DUPLEX BASEBAND SIGNALING," which is herein incorporated by reference in its entirety for all purposes.

BACKGROUND

The present disclosure generally relates to communications systems, and more particularly to communication between multiple nodes over a communication link.

In certain applications, parallel bus communication may be used for communication between nodes. Parallel bus communication usually encompasses a shared channel or communication link that transmits data over several wires simultaneously. For example, a 32 bit parallel bus may have 32 wires, each simultaneously transmitting one bit of information for transmitting a 32 bit word. In certain other applications, serial bus communication is used in communicating between nodes. Serial bus communication may refer to sending data one bit at a time, sequentially, over a shared channel or communication link. For example, each bit of a 32 bit word may be sent sequentially over the communication link. Serial bus communication is generally used in communication between discrete components on a printed circuit board (PCB), cards (e.g., Peripheral Component Interconnect Express (PCIe) cards) on a backplane, or between racks using interconnect cables.

SUMMARY

The present disclosure generally relates to communications systems, and more particularly, to communication between multiple nodes over a communication link. Certain aspects of the disclosure discuss an improved bidirectional communication with reduced errors over a single communication link between multiple nodes. A communication link may refer to a single physical connection between two or more nodes, such as a coaxial cable. In certain embodiments, a robust managed time division duplex protocol is disclosed. In such an implementation, the transmission period for each node is managed such that only one node transmits data over the single communication link during any given transmission period.

In one example aspect of the disclosure, the communication between multiple nodes may be communication between an indoor unit and an outdoor unit of a satellite user terminal in communication with a satellite. An example satellite user terminal may include an indoor unit comprising a first baseband signaling module, and an outdoor unit comprising a second baseband signaling module. In certain implementations, the indoor unit may include a router for routing the first set of data and the second set of data between a user device and the satellite user terminal. In certain implementations, the outdoor unit may also include a satellite modem configured to modulate the first set of data being sent to a satellite and demodulate the second set of data received from the satellite and a radio frequency (RF) communication unit configured to wirelessly transmit data to a satellite through an antenna. In certain implementations, the indoor unit provides power to the outdoor unit through the single communication link.

In some aspects, the second baseband signaling module may be communicatively coupled to the first baseband signaling module using a single communication link between the indoor unit and the outdoor unit. In certain aspects, at least one baseband signaling module from the first baseband signaling module and the second baseband signaling module is further configured to manage allocation of a first transmission period for transmitting data by the first baseband signaling module and a second transmission period for transmitting data by the second baseband signaling module. In some implementations, the first transmission period may be different than the second transmission period.

In the example satellite user terminal, the first baseband signaling module may include a transmitter to transmit a first set of data, using a baseband signaling protocol during the first transmission period, to the second baseband signaling module over the single communication link, and a receiver to receive a second set of data, using the baseband signaling protocol during the second transmission period, from the second baseband signaling module over the single communication link.

Similarly, the second baseband signaling module may include a receiver to receive the first set of data, using the baseband signaling protocol during the first transmission, period from the first baseband signaling module over the single communication link, and a transmitter to transmit the second set of data, using the baseband signaling protocol during the second transmission period, to the second baseband signaling module over the single communication link.

In certain example aspects of the disclosure, each of the first baseband signaling module and the second baseband signaling module may manage the allocation of their respective transmission periods for transmitting. In some instances, the first baseband signaling module and the second baseband signaling module adaptively manage the allocation of their said respective transmission periods. For example, the baseband modules may adaptively manage the allocation of their said respective transmission periods by sending one or more control characters with the transmission of their respective sets of data indicating completion of the transmission. In some instances, the baseband modules and/or protocol may impose a predetermined maximum transmission period. For example, the transmitter for the first baseband signaling module may determine that transmission of the first set of data requires transmission time greater than a predetermined maximum transmission period, and stop transmission of the first set of data beyond the pre-determined maximum transmission period.

In certain embodiments, the at least one baseband signaling module is selected as a leader, wherein the leader manages allocation of transmission periods for communication over the single communication link. In certain embodiments, the at least one baseband signaling module is configured to manage the allocation by performing one or more of synchronizing time between the indoor unit and the outdoor unit, determining a transmission schedule, transmitting the transmission schedule, managing switchover time, managing switchover direction, or responding to reservation requests or any combination thereof.

In certain embodiments, a frequency reference associated with the first baseband signaling module and a frequency reference associated with the second baseband signaling module may be frequency locked. Similarly, a reference clock associated with the first baseband signaling module and a reference clock associated with the second baseband signaling module may be phase locked. In certain embodiments, the transmitter of the first baseband signaling module may be configured to transmit the first set of data to the receiver of the first baseband signaling module during the first transmission period.

In certain aspects of the disclosure, the baseband signaling protocol is a first baseband signaling protocol and the at least one baseband signaling module may further select a second baseband signaling protocol for transmitting and receiving data between the first baseband signaling module and the second baseband signaling module over the single communication link, and switch to using the second baseband signaling protocol for transmitting and receiving the data. In some instances, the second baseband signaling protocol is selected based on one or more signal quality parameters detected on the single communication link. Such example signal quality parameters may include one or more of error rate, signal-to-noise ratio, signal level, and spectral profile. In certain instances, the signal quality parameters are affected by length of the single communication link. The first baseband signaling protocol and the second baseband signaling protocol may include, but are not limited to, one of Non-Return to Zero (NRZ), Partial Response Signaling (PRS) based protocol or Pulse Amplitude Modulation (PAM) based protocol.

An example method for communicating between an indoor unit and the outdoor unit of a satellite user terminal (SUT) may include managing, using at least one baseband signaling module from a first baseband signaling module and a second baseband signaling module, allocation of a first transmission period for transmitting data by the first baseband signaling module and a second transmission period for transmitting data by a second baseband signaling module, wherein the indoor unit comprises the first baseband signaling module and the outdoor unit comprises the second baseband signaling module.

The example method may also include transmitting a first set of data, by the first baseband signaling module, using a baseband signaling protocol, during the first transmission period to the second baseband signaling module over a single communication link between the indoor unit and the outdoor unit and receiving a second set of data, by the first baseband signaling module, using the baseband signaling protocol, during the second transmission period from the second baseband signaling module over the single communication link.

Furthermore, the example method may include receiving the first set of data, by the second baseband signaling module, using the baseband signaling protocol, during the first transmission period from the first baseband signaling module over the single communication link, and transmitting the second set of data, by the second baseband signaling module, using the baseband signaling protocol, during the second transmission period to the second baseband signaling module over the single communication link.

In certain implementations, the method may also include selecting another baseband signaling protocol for transmitting and receiving data between the first baseband signaling module and the second baseband signaling module over the single communication link, and switching to using the selected baseband signaling protocol for transmitting and receiving the data.

The example method may include additional features discussed with respect to the example satellite user terminal discussed above or throughout the disclosure. Furthermore, in certain implementations, the method may be a computer implemented method and/or implemented as computer logic and/or instructions executed from memory or a non-transient computer storable medium.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
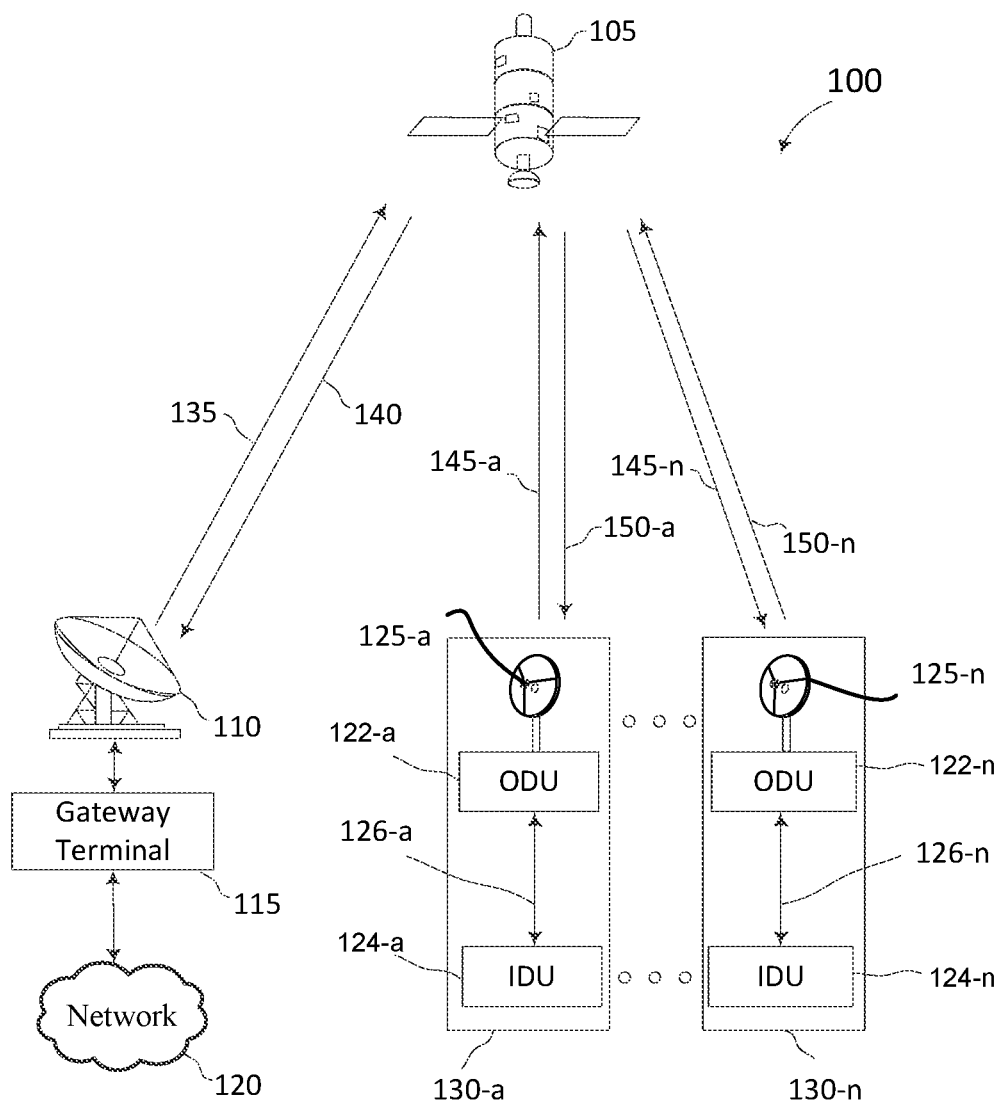
FIG. 1 is a diagram of an exemplary hub-spoke satellite communication system, in accordance with various aspects of the present disclosure.

Techniques are described for communicating across multiple nodes using a single communication link. In certain embodiments, the nodes may be an indoor unit and an outdoor unit of a satellite user terminal for a satellite system. As described in further detail below, the multiple nodes may communicate with each other using a managed time division duplexed baseband signaling protocol over a single communication link.

The following description provides examples and is not limiting the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

In certain applications, parallel bus communication may be used for communication between nodes. Parallel bus communication usually encompasses a shared channel or communication link that transmits data over several wires simultaneously. For example, a 32 bit parallel bus may have 32 wires, each simultaneously transmitting one bit of information for transmitting a 32 bit word.

In certain other applications, serial bus communication is used in communicating between nodes. Serial bus communication may refer to sending data one bit at a time, sequentially, over a shared channel or communication link. For example, each bit of a 32 bit word may be sent sequentially over the communication link. Serial bus communication is generally used in communication between discrete components on a printed circuit board (PCB), cards (e.g., Peripheral Component Interconnect Express (PCIe) cards) on a backplane, or between racks using interconnect cables.

In some instances, parallel bus communication results in increased cost associated with multiple wires, routing of the multiple wires on a printed circuit board (PCB) or off the PCB as cables, driving multiple signals, etc. Additionally, complicated synchronization of the signals being routed on multiple wires generally puts an upper bound on the speed that the parallel bus communication protocols can operate at. Therefore, in some applications, it may be advantageous to communicate using a serial bus communication protocol.

A Serializer/Deserializer (SerDes) may support converting signals from a serial bus communication protocol to a parallel bus communication protocol and vice versa, such that components using a serial bus communication and parallel bus communication may communicate with each other through a SerDes. A SerDes may facilitate using available serial bus communication components with parallel bus communication components discussed in this disclosure. For example, a well-known interface, such as Reduced Gigabit Media Independent Interface (RGMII) (specified in Institute of Electrical and Electronics Engineers (IEEE) 802.3) with 4 lines in each receive (Rx) and transmit (Tx) direction may be converted to Serial Gigabit Media Independent Interface (SGMII) (also specified in IEEE 802.3) using an SerDes, which has only one line in each Rx and Tx direction. Such a SerDes is increasingly used for interfacing between Gigabit Ethernet (GbE) Media Access Control (MAC) layer and Physical layer (Phy) of the network stack (e.g., Open Stack Interface (OSI) network stack). However, as discussed below, current serialized bus communication protocols are not adequate for communication over a single communication link while maintaining low error rate.

Currently, several implementations, such as PCB traces and high speed links (Gigabits per second or higher) employ a full-duplex communication, which supports simultaneous transmissions in both directions by providing dedicated communication links in the transmit (Tx) and receive (Rx) direction. In certain instances, such full-duplex communication that require multiple wires may be cost prohibitive. For example, using multiple wires over long distances between two nodes may significantly add to the cost and also complicate the hardware architecture.

Alternatively, some implementations, such as IEEE related standards and 10base2, employ half-duplex communication. In half-duplex communication, transmission is in one direction at a time, switching direction in time, back and forth, allowing a sharing of a single communication link for both directions. Although, a single communication link can support half-duplex communication, in half-duplex communication, the latency and bandwidth associated with the communication link is severely impacted by ad-hoc communication allowed by each node in half-duplex communication. In half-duplex communication, any node can transmit at any time. If multiple nodes transmit during the same time period, transmissions from various transmitting nodes collide (referred to as data collision). Such collisions result in data errors over the communication link.

To mitigate data errors from such collisions, the receiving node may perform error correction or deem the error rate as acceptable. In the alternative, the transmitting node may retry the transmission at a later point in time. Carrier Sense and Collision Detection (CSCD) is one such retransmission protocol. Using a protocol, such as CSCD, once a collision is detected, the nodes typically stop communicating for a time period, then try again. In some implementations, the time period is randomized. In other implementations, the time period is randomized with a lower bound.

If the error rate is not acceptable, both data correction and/or retries of the transmission result in increase in latency and decrease in bandwidth. Therefore, a half-duplex communication scheme may be inadequate for communications requiring low data error rate, since such link errors require error correction and/or retransmission, increasing latency, system complexity and size of memory for data buffering.

The communication link between an outdoor unit and an indoor unit in a satellite user terminal is one such example of a system, where a single communication link with low error rate, low latency and high bandwidth is desirable. Such a system is described in more detail in the following figures. For example, in a satellite user terminal, a frame error rate (FER) of $10\,e^{-7}$ (or roughly a bit error rate (BER) of $10\,e^{-11}$) is often desirable between an indoor unit (IDU) and outdoor unit (ODU) link used in satellite communications, for which the above traditional full-duplex and half-duplex communication schemes are not adequate.

Certain aspects of the disclosure discuss an improved bidirectional communication with reduced errors over a single communication link between multiple nodes. A communication link may refer to a single physical connection between two or more nodes, such as a coaxial cable. In certain embodiments, a robust managed time division duplex baseband signaling protocol is disclosed. In such an implementation, the transmission period for each node is coordinated amongst the nodes and managed such that only one node transmits data over the single communication link during any given transmission period.

Furthermore, aspects of the disclosure disclose transmitting data using a managed time division duplex baseband signaling protocol. In certain aspects of the disclosure, baseband signaling may refer to transmitting data without modulation, i.e., without using a carrier signal for transmitting the data. Generally, baseband signaling operates by generating bi-level or multi-level pulses within a frequency range that spans from direct current (DC) to the frequency equal or above the symbol rate (e.g., up to 1 GHz for 1 Gbps transmission rate). In some cases reducing spectral energy around DC is desirable, for example to prevent saturation that may occur in various processing steps. One way of reducing DC energy is by coding, e.g., by inserting overhead bits that balance the DC content of the pulse train, maintaining the average DC voltage at zero. Using baseband signaling may reduce the design and component cost associated with modulating and demodulating the data over the carrier signal and the additional power associated with transmitting the carrier signal. In certain aspects of the disclosure, time division duplexing may refer to dividing the time for transmitting data on the communication link in to transmission periods, such that multiple nodes can transmit on the same communication link during different transmission periods and communicate with other nodes electrically coupled to the communication link. Transmitting and receiving data over a single communication link between multiple nodes using the disclosed managed time division duplexed baseband signaling protocol may significantly reduce the costs associated with running multiple communication links like cables over long distances. Furthermore, in certain embodiments, one node can also power another node using the single communication link.

FIG. 1 is a diagram of an exemplary hub-spoke satellite communication system 100 in accordance with various aspects of the present disclosure. The satellite communication system 100 includes a satellite 105 linking a gateway terminal 115 with one or more satellite user terminals 130 (130a . . . 130n) or simply satellite user terminals 130. The satellite communication system 100 may use a number of network architectures consisting of space and ground segments. The space segment may include more than one satellite while the ground segment may include a large number of satellite user terminals, gateway terminals, network operations centers (NOCs), satellite and gateway terminal command centers, and the like. These elements are not shown in the figure for clarity.

The gateway terminal 115 is sometimes referred to as a hub or ground station. The gateway terminal 115 may service forward uplink signals 135 to the satellite 105 and return downlink signals 140 from the satellite 105. The gateway terminal 115 may also schedule traffic to the user terminals 130. Alternatively, the scheduling may be performed in other parts of the satellite communication system 100 (e.g., at one or more NOCs and/or gateway command centers neither of which are shown in this example).

The gateway terminal 115 may also provide an interface between a network 120 and the satellite 105. The gateway terminal 115 may receive data and information from the network 120 that is directed to the satellite user terminals 130. The gateway terminal 115 may format the data and information for delivery to the satellite user terminals 130 via the satellite 105. The gateway terminal 115 may also receive signals carrying data and information from the satellite 105. This data and information may be from the satellite user terminals 130 and directed to destinations accessible via the network 120. The gateway terminal 115 may format this data and information for delivery via the network 120.

The network 120 may be any type of network and may include, for example, the Internet, an IP network, an intranet, a wide-area network (WAN), a local-area network (LAN), a virtual private network (VPN), a public switched telephone network (PSTN), a public land mobile network, and the like. The network 120 may include both wired and wireless connections as well as optical links. The network 120 may connect the gateway terminal 115 with other gateway terminals that may be in communication with the satellite 105 or with other satellites.

The gateway terminal 115 may use one or more antennas 110 to transmit the forward uplink signals 135 to the satellite 105 and to receive the return downlink signals 140 from the satellite 105. The antenna 110 shown in FIG. 1 includes a reflector with high directivity in the direction of the satellite 105 and low directivity in other directions. The antenna 110 may be implemented in a variety of alternative configurations and include operating features such as high isolation between orthogonal polarizations, high efficiency in the operational frequency bands, low noise, and the like.

In some satellite communication systems, there may be a limited frequency spectrum available for transmission. Forward uplink signals 135 and return downlink signals 140 may use the same, overlapping, or different frequencies compared to the return uplink signals 145 from the satellite user terminals 130 to the satellite 105, and/or forward downlink signals 150 from the satellite 105 to the satellite user terminals 130. In some examples, the gateway terminal 115 may be located away from the satellite user terminals 130, which enables frequency reuse. In other examples, the satellite user terminals 130 may be located near the gateway terminal 115.

The satellite 105 may be a geostationary satellite that is configured to receive and transmit signals. The satellite 105 may receive the forward uplink signals 135 from the gateway terminal 115 and transmit one or more corresponding forward downlink signals 150 to one or more satellite user terminals 130. The satellite 105 may also receive one or more return uplink signals 145 from one or more satellite user terminals 130 and transmit corresponding return downlink signals 140 to the gateway terminal 115.

The satellite communication system 100 may employ spot beam coverage areas with a high degree of frequency reuse. Satellite 105 may utilize a large number of small spot beams covering a large composite area. Each spot beam may carry one or more forward uplink signals 135 and return uplink signals 145. The spot beams may allow for flexible and configurable allocation of bandwidth. In the example shown in FIG. 1, the gateway terminal 115 and the satellite user terminals 130 may be within the same or different spot beams. Each spot beam may use a single carrier (i.e., one carrier frequency), a contiguous frequency range, or a number of frequency ranges.

The satellite communication system 100 may implement fixed spot beams using a fixed multi-beam antenna (MBA) and/or an active phased array antenna (APAA). The MBA may serve fixed beams, and the communications links may be switched over time in a pattern consisting of combinations of forward uplink signals 135 and return uplink signals 145. The APAA may be used as a beam-hopping antenna. The APAA may provision communications between user terminals 130 using two independently steerable beams for each of the transmitting and receiving antennas. Beam steering is achieved by updating pointing directions via control of digital phase shifters in switching interval slots as short as 2 ms in Satellite Switched Time Division Multiple Access (SS-TDMA) mode, where the shortest beam dwell time corresponds to the slot time of the SS-TDMA system. Switching patterns for both the MBA and APAA may be uploaded from the gateway terminal 115.

A high-capacity architecture used in satellite communication system 100 may include small spot beams targeted at fixed locations. Each spot beam may use a large amount of spectrum, for example, 250-1000 MHz. The resulting large capacity is a product of several characteristics of the satellite communication system 100, including, for example, (a) the large number of spot beams, typically 60 to 80 or more, (b) the high antenna directivity associated with the spot beams (resulting in, for example, advantageous link budgets), and (c) the relatively large amount of bandwidth used within each spot beam.

The forward downlink signals 150 may be transmitted from the satellite 105 to one or more of the user terminals 130. The user terminals 130 may receive the forward downlink signals 150 using antennas 125. In one example, an antenna and a user terminal together include a very small aperture terminal (VSAT) with the antenna measuring approximately 0.75 meters in diameter and having approximately 2 watts of power. In other examples, a variety of other types of antennas 125 may be used to receive the forward downlink signals 150 from the satellite 105. Each of the satellite user terminals 130 may include a single user terminal or a hub or router coupled to other user terminals. Each of the user terminals 130 may be connected to various consumer premises equipment (CPE) such as computers, local area networks, internet appliances, wireless networks, and the like.

The satellite user terminals 130 may transmit data and information to a destination accessible via the network 120. The user terminals 130 may transmit the return uplink signals 145 to the satellite 105 using the antennas 125. The user terminals 130 may transmit the signals according to a variety of physical layer transmission techniques including a variety of multiplexing schemes and/or modulation and coding schemes. For example, the satellite user terminals 130 may use high speed signal switching for the return uplink signals 145. The switching patterns may support both MBA and APAA systems. When the user terminals 130 use high speed signal switching for the return uplink signals 145, each transmitted signal may be an example of a pulsed RF communication from the satellite user terminal 130.

The satellite user terminals 130 may operate at radio frequency (RF) bands such as Ka band frequencies. The amount of frequency resources and fraction of time a satellite user terminal 130 transmits may determine the capacity of the satellite user terminal 130. The capacity may be changed by changing the fraction of time used for transmissions. This may provide flexibility in allocating capacity between different satellite user terminals both temporally and spatially (e.g., temporally by changing capacity allocation for a particular coverage area over time and spatially by changing capacity allocation for a particular spot beam coverage area over time).

The satellite user terminals 130 may transmit based on a transmit signal switching pattern (e.g., a transmit switching sequence). The switching pattern may be a set of on/off periods versus time during a frame. The satellite user terminals 130 may enable transmissions during the on periods and may disable transmissions over the spot beam during the off periods. The switching pattern may be synchronized in time with a switching pattern of the satellite 105 or gateway terminal 115. The switching pattern may be stored in memory at the satellite user terminals 130 and may be received from the satellite 105 using a downstream signal that may be either in-band or out-of-band with other downstream signals.

In some examples, satellite user terminals 130 may obtain an input signal. For example, when satellite user terminal 130-a receives forward downlink signal 150-a from the satellite 105, the forward downlink signal 150-a may be the input signal. As another example, prior to transmission of the return uplink signal 145-a to the satellite 105, the return uplink signal 145-a may be the input signal.

The satellite user terminals 130 may include an outdoor unit 122 (ODU) and an indoor unit (IDU) 124. The outdoor unit 122 and the indoor unit 124 may be coupled to each other using a communication link 126. The outdoor unit 122 may have radio frequency circuitry to wirelessly communicate with the satellite 105 using the uplink 145 and downlink 150 through the antennae 125. The indoor unit 124 may have a wired or wireless router connected to the user's computer or computer network (not shown) for communicating information back and forth with the user. The indoor unit 124 facilitates the communication between the user and the outdoor unit 122 over the communication link 126 so that the outdoor unit 124 can communicate with the gateway terminal 115 through the satellite 105.

In certain embodiments, the outdoor unit 122 and the indoor unit 124 may be placed in separate physical locations. For example, the outdoor unit 122 may be placed outside the customer's premise for facilitating improved wireless connectivity with the satellite 105 using the antennae 125 coupled to the outdoor unit 122. On the other hand, as the name implies, the indoor unit 124 may be placed inside the customer's premise. As will be discussed in more detail later, the indoor unit 124 may have a wired or wireless router for connecting to a computer or a network of computers.

Figure 2:
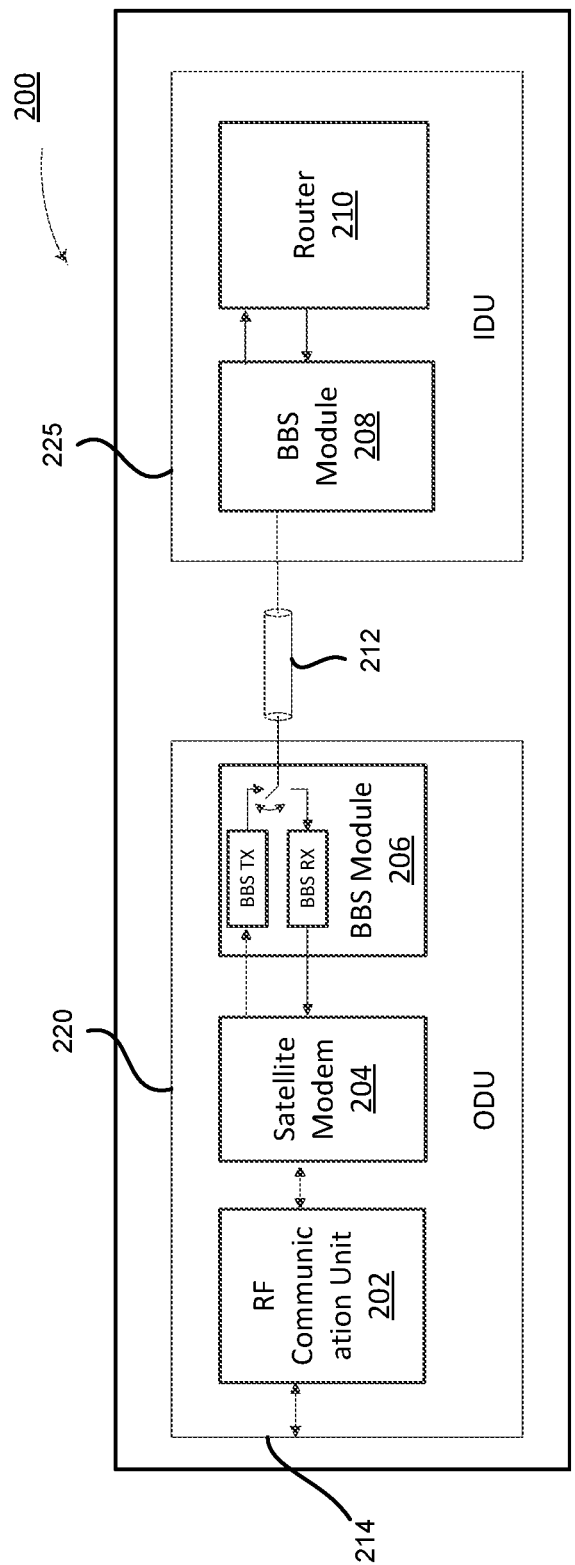
FIG. 2 is a block diagram illustrating example components of a satellite user terminal comprising an indoor unit and outdoor unit, according to certain aspects of the present disclosure.

FIG. 2 is a block diagram illustrating certain components of a satellite user terminal comprising an indoor unit and outdoor unit, according to certain aspects of the disclosure. The satellite user terminal 200 shown in FIG. 2 illustrates one non-limiting implementation of the satellite user terminal 130 shown in FIG. 1. In particular, the outdoor unit (ODU) 220, the single communication link 212, and the indoor unit (IDU) 225 of FIG. 2 illustrate a particular non-limiting illustration of the outdoor unit (ODU) 122, communication link 126 and the indoor unit (IDU) 124 of FIG. 1, respectively.

As illustrated in FIG. 2, the outdoor unit 220 includes radio frequency (RF) communication unit 202, a satellite modem 204, and baseband signaling (BBS) module 206. In addition to the components shown in FIG. 2, the outdoor unit 220 may include other components (not shown) such as processing entities, memory buffers, powering circuitry, and several other components similar to the components discussed with respect to the computer system of FIG. 13.

In certain embodiments, the RF communication unit 202 may be configured to wirelessly communicate with a satellite 105 through an antenna. The RF communication unit 202 may also include RF electronics to perform digital to analog (DAC) and analog to digital (ADC) conversion, up/down conversion, power amplifier (PA)/low noise amplifier (LNA) function, and signal conditioning/filtering.

In certain embodiments, the satellite modem 204 performs encoding/modulation, demodulation/decoding, error correction, control functions, data buffering memory and interfacing with BBS module 206. In certain implementations, the satellite modem 204 may also include satellite transport stream/packet processing and encryption/decryption. In alternate implementations, such functions could be included in the indoor unit 225, either inside the router 210 or as a separate circuit or processing logic.

Figure 3:
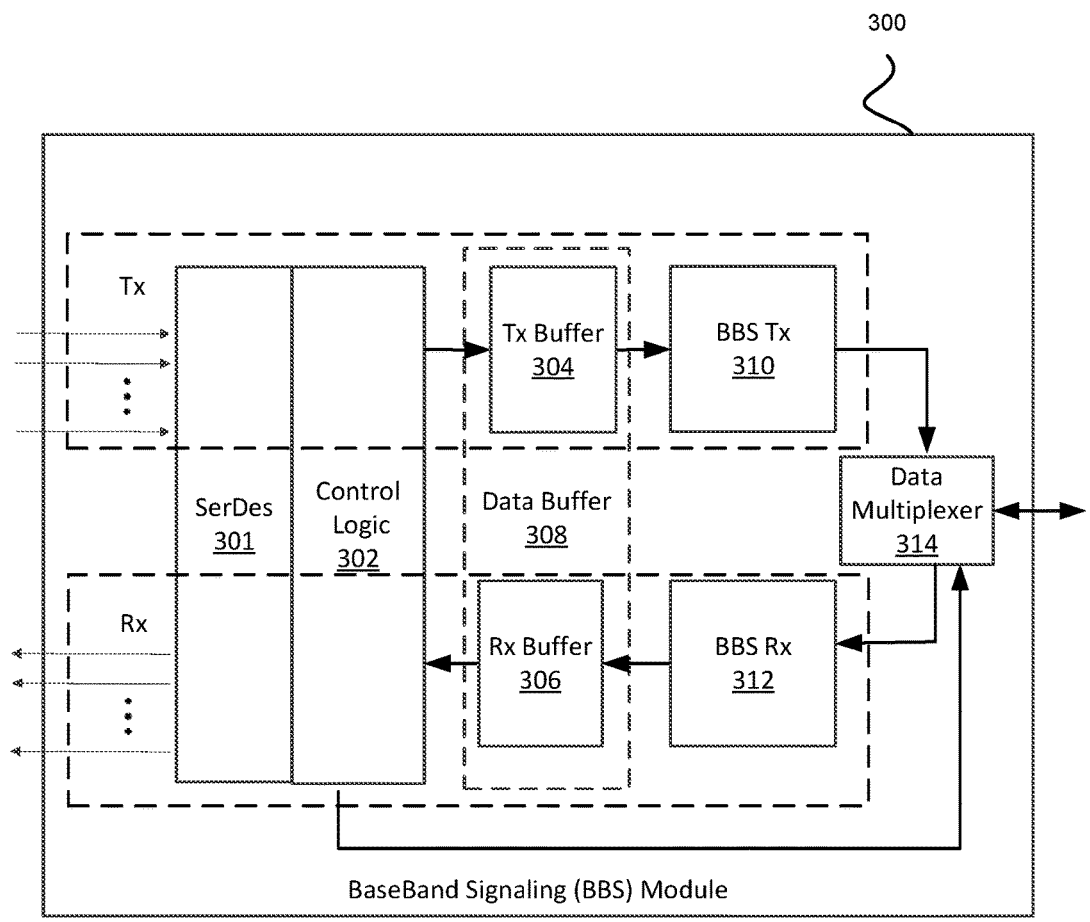
FIG. 3 is a block diagram illustrating example components of a baseband signaling module, according to certain aspects of the present disclosure.

In certain embodiments, according to certain aspects of the disclosure, the BBS module 206 of the outdoor unit 220 may be responsible for communicating data over the single communication link 212 with the other node—i.e., the BBS module 208 of the indoor unit 225. The BBS module 206 of the outdoor unit 220 and BBS module 208 of the indoor unit 225 may have similar components and may together orchestrate managed time division duplexed baseband signaling of data across the single communication link 212, according to aspects of the disclosure. FIG. 3 provides a more detailed illustration of a non-limiting implementation of the BBS module.

In certain embodiments, the BBS modules (206 and 208) may facilitate the managed time division duplexed baseband signaling protocol. For example, the BBS modules (206 and 208) may have the control logic for managing the allocation of the transmission periods and BBS transmit (Tx) and BBS receive (Rx) buffers for temporarily buffering data and baseband signaling logic for transmitting a set of data over the single communication link 212. A set of data may refer to a one or more units of data, wherein each unit of data may be a plurality of bits and may be organized in bytes, words, doublewords, etc. FIG. 3 provides a more detailed illustration of a non-limiting implementation of the BBS module.

The communication between the nodes (i.e., outdoor unit 220 and the indoor unit 225) is accomplished using a managed time division duplexed protocol, in the sense that each node has an allocated transmission period during which the node transmits a set of data and the other node receives the transmitted set of data. In certain instances, a transmission period may also be referred to as a frame and may be used interchangeably with a transmission period, throughout this disclosure. At any given point in time, only one node transmits a set of data, whereas the other nodes may receive the transmitted set of data. The allocation of any given transmission period is determined by one of the nodes. In one implementation, one of the nodes is considered a leader node and is responsible for allocation of the transmission periods. In another implementation, a more adaptive allocation of transmission period may be supported, wherein each node determines its own transmission period by ending the transmission using a pre-defined control character.

In certain embodiments, the indoor unit 225 may also have a router 210 coupled to the BBS module 208 for communicating data between the BBS module 208 and the computer system or the network of computer systems (not shown) coupled to the indoor unit 225. The computer system or the network of computer systems may include personal communication devices or user devices such as mobile devices, laptops, gaming counsels and devices, appliances, workstations, computer servers, or any other computing device connected to a gateway through the satellite. In personal device or user communication device may be implemented using one or more components disclosed in the computing device of FIG. 13. The coupling between the router 210 and a computer system or the network of computer systems may be either wired (e.g., Ethernet) or wireless (e.g., WiFi). In some implementations, the router may also include some satellite modem and BBS modem functions.

FIG. 3 is a block diagram illustrating example components of a BBS module according to certain aspects of the present disclosure. FIG. 3 discloses a more detailed non-limiting illustration of the BBS modules (206 and 208) discussed in FIG. 2. The BBS module 206 in the outdoor unit 220 and the BBS module 208 in the indoor unit 225 may have similar components and functionality to the BBS module 300 of FIG. 3 and may be compatible with each other for communication using the same managed time division duplexing baseband signaling protocol discussed herein.

As shown in FIG. 3, the BBS module 300 may include a SerDes module 301, control logic 302, data buffer 308 comprising transmit (Tx) buffer 304 and receive (Rx) buffer 306, BBS data transmitter (BBS TX) 310 or simply transmitter 310, a BBS data receiver (BBS RX) 312 or simply receiver 312, and a data multiplexer 314.

In certain embodiments, the SerDes module 301 provides the conversion between the serial and parallel bus communication interfaces. For example, at least in certain aspects of the disclosure, the satellite modem 204 may be coupled to the BBS module 206 using a parallel bus communication interface. The SerDes module 301 converts parallel bus communication interface to serial bus communication interface in the direction of the data transmitting from the satellite modem 204 to the BBS module 206 and converts the serial bus communication interface to parallel bus communication interface in the other direction. As previously discussed, a well-known example interface RGMII (specified in IEEE 802.3) with 4 lines in each Rx and Tx direction may be converted to SGMII (also specified in IEEE 802.3), which has only one line in each Rx and Tx direction (at wire rate of 1.25 Gbps each).

Figure 4A:
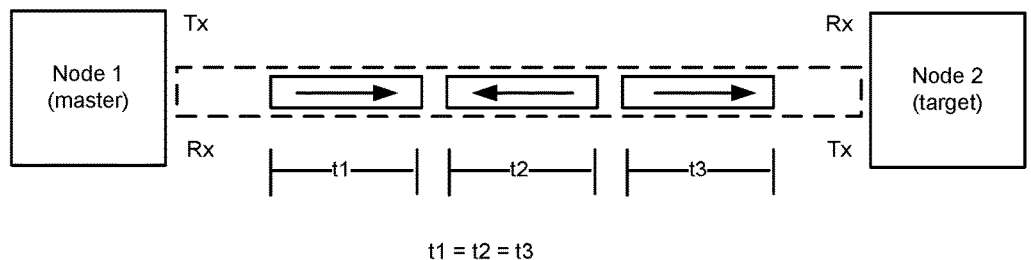
FIG. 4A, FIG. 4B and FIG. 4C each illustrating management of transmission periods, according to certain aspects of the present disclosure.
Figure 4B:
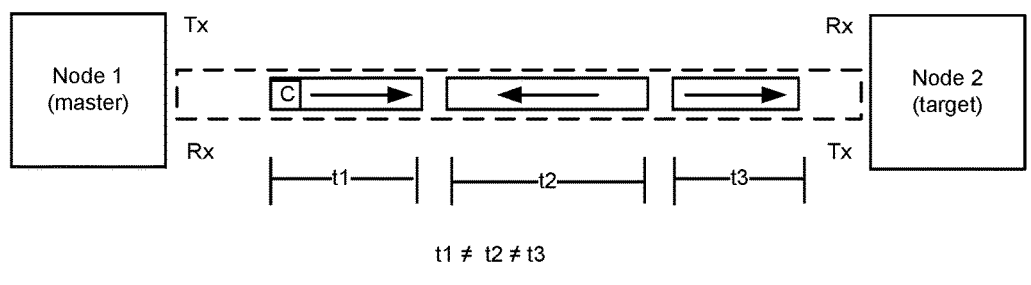
Figure 4C:
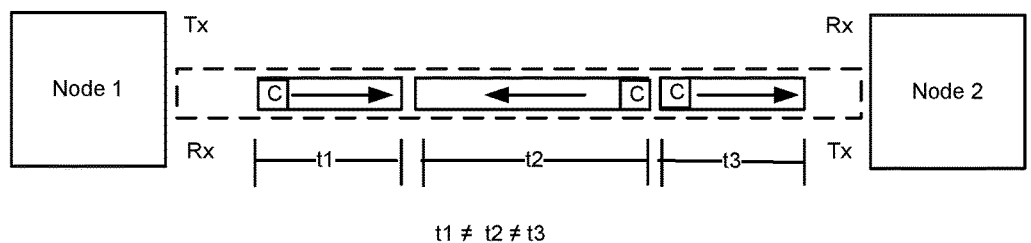

In certain aspects of the disclosure, the control logic 302 may be responsible for implementing the managed time division duplexing protocol. For example, the control logic 302 may be responsible for managing the allocation of the transmission periods with the other nodes, such that only one node transmits on the single communication link 212 at any given point in time. In the unlikely event that a collision still occurs, safety mechanism for recovery may include retry after a short time out. The control logic 302 coordinates with other nodes (i.e., the control logic associated with the respective nodes) and provides the control signal for selecting the output/input for the data multiplexer 314 based on the transmission period allocated to the node. In other words, the control logic 302 may control whether the node transmits a set of data or receives a set of data by controlling the data multiplexer 314. The control logic 302 may also determine the schedule of transmission between the different nodes, and the transmission periods for each node. FIG. 4A, FIG. 4B and FIG. 4C illustrate several non-limiting scheduling and transmission schemes, according to aspects of the disclosure, in more detail.

In FIG. 3, the control logic 302 is disclosed as part of the BBS module 300. However, in alternate implementations, the control logic 302 may be implemented elsewhere in the node. Furthermore, the processing functions of the control logic 302 may be consolidated with the processing functions of other modules, such as the satellite modem, router, etc., into a single processing entity, such as a general purpose processor, an Application-Specific Integrated Circuit (ASIC), or a Field Programmable Gate Array (FPGA). In certain embodiments, the processing entity may execute instructions from memory or a non-transient computer-readable medium for providing functionality associated with the control logic 302.

In certain embodiments, the control logic 302 may introduce a switchover delay while changing the direction of the data transmission to account for propagation delay for the single communication link and the associated digital and analog logic, such as the draining of the current transmissions from the single communication link and switching of the digital and analog logic from one direction to the other. In one embodiment, at the beginning of the transmission period, before the set of data is transmitted, idle data (for example, 0/1 toggling pulses) is transmitted to allow additional time for clock and data recovery (CDR) to obtain lock and recover the clock.

In certain embodiments, the frequency references for each node may be frequency and/or phase locked between the nodes, eliminating or reducing timing differences. A frequency reference may refer to a fixed frequency from which operational frequencies may be derived or with which they may be compared. In one embodiment, the reference frequency is obtained from a GPS receiver in each node. In another embodiment, the reference clock in the node is phase-locked to a reference clock of another node (e.g., leader node) so that the switchover delay can be eliminated or its duration reduced, improving data throughput. A reference clock may refer to a fixed clock from which operational clocks may be derived or with which they may be compared. Phase locking two reference clocks may refer to synchronizing and/or maintaining the synchronization of the two clocks such that that they operate at the same phase or an acceptable deviation in phase from each other at any given point in time.

In certain embodiments, the BBS module 300 may have a data buffer 308. In certain implementations, the data buffer 308 may be logically separated into a Tx buffer 304 for storing data until the node is ready for transmission and Rx buffer 306 for temporary buffering of the set of data before transmitting the data to the satellite modem or router. The Tx buffer 304 and the Rx buffer 306 also facilitate converting from one rate to another rate and serial to de-serialization conversion by providing additional time for the conversion. The Tx buffer 304 and the Rx buffer 306 facilitate immediate transmission of the set of data as soon as the transmission period is available and immediately receiving the set of data as soon as the data arrives, respectively. In certain implementations, the Tx buffer 304 and the Rx buffer 306 may be physically separate from each other, as part of the transmit and receive pipelines. In other implementations, the data buffer 308 may be shared with other entities such as the satellite modem and the router.

The BBS transmitter 310 may process and transmit the set of data from the Tx buffer 304 using a baseband signaling protocol. The BBS receiver 312 receives the set of data and converts the data back to digital data according to the baseband signaling protocol. In certain embodiments, the BBS transmitter 310 and BBS receiver 312 can support multiple baseband signaling protocols. In certain embodiments, the control logic 302 may select the baseband signaling protocol. Examples of baseband signaling protocols include, but are not limited to Non-Return to Zero (NRZ), Partial Response Signaling (PRS) based protocol or Pulse Amplitude Modulation (PAM) based protocol.

As discussed previously, the data multiplexer 314 is controlled by a control signal from the control logic 302 and determines the transmission or receiving of the baseband signal from the single communication link.

As shown in FIG. 4A, FIG. 4B and FIG. 4C, according to certain aspects of the disclosure, the control logic 302 at the nodes may manage the allocation of the transmission periods for a time division duplexed scheme. Transmission period may refer to the allocated time for which an assigned node with the transmission period may transmit information over the single communication link. The transmission period may also be referred to as a frame, and may be used interchangeably without deviating from the scope of the disclosure. Furthermore, a direction frame, in a two node system, may refer to the transmission period and the direction in which the transmission occurs (i.e., from node 1 to node 2 or from node 2 to node 1) between the two nodes.

The amount of data being sent during a transmission period is directly proportional to the transmission speed for the transmission period. For example, for one gigabit per second rate, and a transmission period of one millisecond, the transmitted data is one megabit.

The gap between the transmission periods shown in the figures may be referred to as switchover delay and may help avoid data errors due to the propagation delay for signals on the single communication link and any additional switchover delay associated with the digital and analog logic.

FIG. 4A and FIG. 4B illustrate a protocol where one of the nodes is selected as a leader node and the other nodes are follower nodes. In such an implementation, the leader node may manage the allocation of the transmission periods for all of the nodes. A leader node may be pre-selected and/or pre-negotiated between the nodes. The leader node may also be selected using a variety of known selection algorithms, such as acquisition of the link or based on some other characteristics of the node.

As shown in FIG. 4A, the arrow indicates the direction of the transmission during any given transmission period. For instance, during transmission period t1, the transmission is from node 1 to node 2. During transmission period t2, the transmission is from node 2 to node 1 and during transmission period t3, the transmission is again from node 1 to node 2. In FIG. 4A, the leader may determine a fixed size for the transmission period. For example, in FIG. 4A, the transmission periods t1, t2 and t3 are the same.

In an alternate embodiment, the leader node may select different transmission periods for the transmissions for each direction. For example, transmission periods t1 and t3 may have the same length of time associated with them, whereas t2 and any subsequent transmissions from the node 2 to node 1 may have the same transmission periods. Such an implementation may support asymmetry in the desired bandwidth in the opposing directions while maintaining low complexity. For examples, consumers may have much higher need for download bandwidth than upload bandwidth. In such a scenario, the transmission periods from the outdoor unit to the indoor unit might be selected to be larger than the transmission periods from the indoor unit to the outdoor unit.

FIG. 4B illustrates an embodiment that supports different transmission periods for each of the transmissions. In one implementation, the follower node (i.e., node 2) may request a transmission period of a particular time period (not shown). In response, the leader node (i.e., node 1) may allocate a transmission period for the follower node and transmit the information regarding the scheduling of the transmission period for the follower node (i.e., when and for how long the follower node (i.e., node 2) can transmit for). The leader node may send this information to the follower node using overhead information. For instance, the leader node may send the scheduling information using a control character (indicated by "C" in FIG. 4B) followed by the scheduling information to the follower node. The leader node can schedule its own transmission periods (e.g., transmission period t3) without further consultation with the follower nodes, since the leader node is already aware of the transmission schedules for all the follower nodes.

FIG. 4C illustrates adaptive management of the scheduling of the transmission periods. In such an implementation, each node manages the length of their own transmission periods by appending the transmitted set of data with one or more control characters. The control characters indicate the end of the transmission. Control characters are special bit patterns that data cannot have, preventing false detects. Upon receiving the control character, another node can start the transmission—generally after a short delay to accommodate timing disparities and switching delays between nodes. In such an implementation, there is no leader node and each node can determine its own transmission periods.

In certain embodiments, to maintain fairness in the amount of time a node can transmit for, the protocol described herein may impose a maximum transmission period, so that the transmitting node relinquishes the single communication link at least once the maximum transmission period is reached. In certain implementations, the node or the transmitter associated with the node may determine that transmission of the set of data requires transmission time greater than a pre-determined maximum transmission period, and may stop transmission of the set of data beyond the pre-determined maximum transmission period. In certain implementations, no control character may be needed to signal the end of transmission, since the other nodes operating using the same protocol may already know the pre-negotiated and/or pre-determined maximum transmission period that indicates the end of the transmission period.

FIG. 4A, FIG. 4B and FIG. 4C illustrate a two node system with alternating transmission between the two nodes. Alternating of the transmission between the two nodes maintains fairness, without adding complexity to the transmission logic. In a scheme with alternating transmission between the two nodes, the protocol can still support asymmetry in transmission of data in one direction with respect to the other direction by varying the size of the transmission periods. However, in an alternate embodiment, especially in embodiments with a leader node, the leader node may allocate multiple subsequent transmission periods to a node for transmission of data for supporting asymmetry of data transmission in the opposing directions.

In a multi-node system with more than two nodes, such as the system discussed with reference to FIG. 9, any well-known fairness algorithm may be used so that each of the nodes on the single communication link can routinely transmit on the single communication link.

Figure 5:
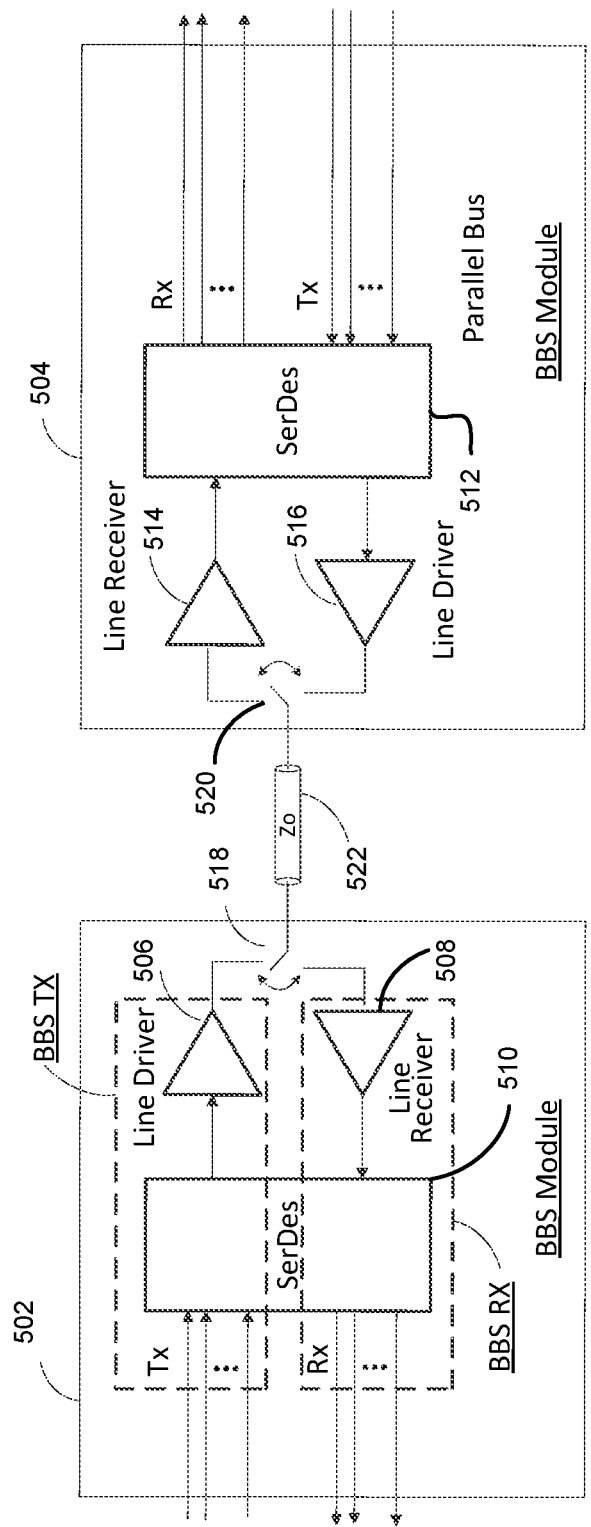
FIG. 5 is a block diagram illustrating certain components of a satellite user terminal comprising an indoor unit and outdoor unit, according to certain aspects of the present disclosure.

FIG. 5 is a block diagram illustrating baseband signaling modules in communication with each other using a single communication link, according to certain aspects of the disclosure. The BBS modules (502 and 504) of FIG. 5 are similar to the BBS modules of FIG. 2 and FIG. 3. The SerDes modules (510 and 512) are configured to facilitate communication between the parallel bus communication interface and the serial bus communication interface for the BBS modules (502 and 504), respectively. FIG. 5 illustrates performing switching of the direction of the transmission in a controlled manner by synchronizing the nodes and coordinating the position of the switch.

In certain embodiments, aspects of the disclosure are compatible with existing protocols, including RGMII/SGMII, enabling the use of existing chipset solutions with little or no modifications. Although, for simplicity, FIG. 5 discloses two nodes, disclosed techniques may be applicable to multi-node systems, such as the system of FIG. 9, with more than two nodes.

The BBS module 502 is electronically coupled to the single communication link 522 via switch 518 and the BBS module 504 is electronically coupled to the single communication link 522 via switch 520. The BBS module 502 controls the switching of the switch 518, whereas the BBS module 504 controls the switching of the switch 520. The control logic associated with the BBS modules 502 and 504 coordinates the transmission periods allocated to each BBS module. Examples of such coordination protocols are provided in FIG. 4A, FIG. 4B and FIG. 4C.

For a transmission period allocated to BBS module 502, the BBS module 502 controls the switch 518, such that a line driver 506 is electrically coupled to the single communication link 522 through the switch 518. During the same time period that BBS module 502 is transmitting, BBS module 504 is configured to receive the transmission by controlling the switch 520, such that the single communication link 522 is electrically coupled to the line receiver 514 of the BBS module 504. Similarly, for a transmission period allocated to BBS module 504, the BBS module 504 controls the switch 520, such that the line driver 516 is electrically coupled to the single communication link 522 through the switch 520. During the same time period that BBS module 504 is transmitting, BBS module 502 is configured to receive the transmission by controlling the switch 518, such that the single communication link 522 is electrically coupled to the line receiver 508 of the BBS module 502. As disclosed with respect to FIG. 5 and other figures of this disclosure, line driver and transmitter may be used interchangeably without deviating from the scope of the disclosure. Similarly, line receiver and receiver may also be used interchangeably without deviating from the scope of the disclosure.

In certain embodiments, the line drivers (506 and 516) may include pre-emphasis logic and the line receivers (508 and 514) may include an equalizer. High speed signals transmitted over long distances are adversely affected by copper and dielectric losses of the cable and crosstalk. The signal attenuation, which typically increases with frequency and cable length, makes it difficult for the receiver to interpret the information. Pre-emphasis on the line driver and equalizers on the line receivers may be used to compensate for the signal degradation. Pre-emphasis on the line driver provides a method of boosting the energy every time there is a transition in the direction of the data transmission, since this is when the most issues occur. Equalizer on the line receiver provides functionality to help overcome signal losses of the transmission medium. Receiver equalization acts as a high pass filter and amplifier to the data as it enters into the line receiver. This allows the line receiver to rebuild the signal and interpret it successfully. Both the pre-emphasis and the equalizer may be adaptive, adjusting the correction amount to the type/length of the transmission media/cable.

Figure 6:
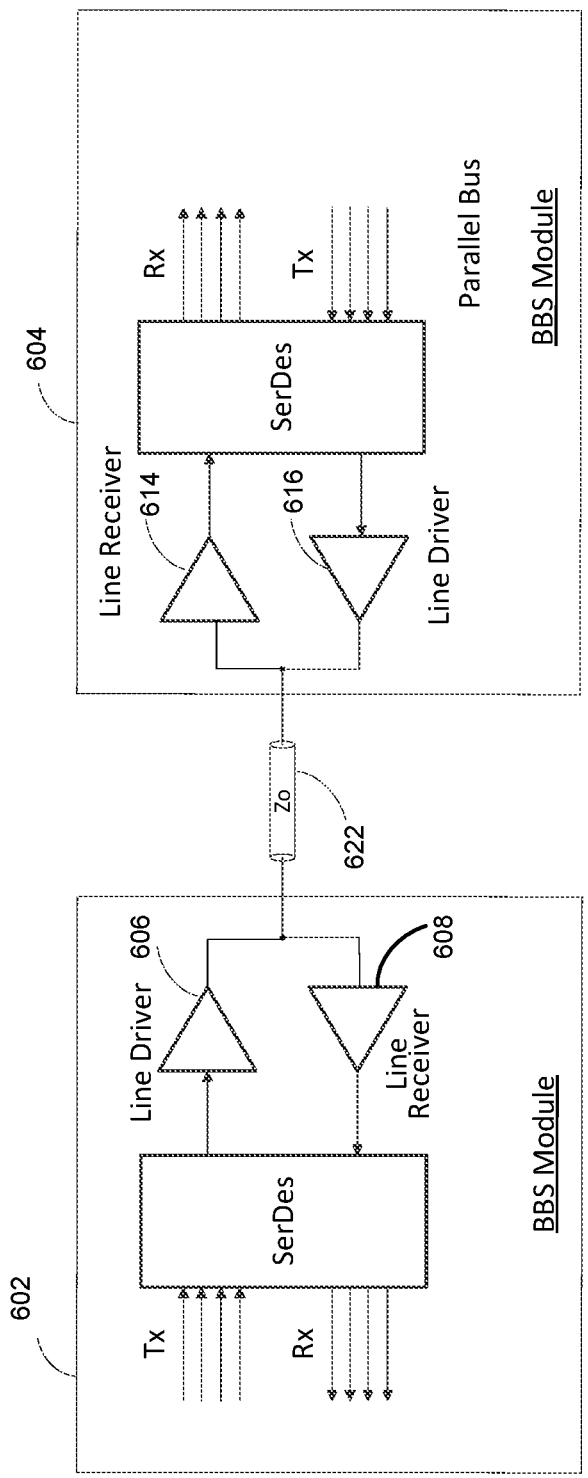
FIG. 6 is a block diagram illustrating certain components of a satellite user terminal, according to certain aspects of the disclosure.

FIG. 6 is a block diagram illustrating baseband signaling modules in communication with each other using a single communication link, according to certain aspects of the disclosure. Components of FIG. 6 are similar to FIG. 5, except for the switches that are replaced with a hard wired OR connection between the line driver 606, 616 and the line receiver 608, 614 on the same BBS module. In certain implementations, replacing physical switches may improve component costs and latency associated with physical components. As disclosed with respect to FIG. 6 and other figures of the disclosure, line driver and transmitter may be used interchangeably without deviating from the scope of the disclosure. Similarly, line receiver and receiver may also be used interchangeably without deviating from the scope of the disclosure.

In one embodiment, the inactive line device is muted/tri-stated. For example, when receiving, each BBS module (602, 604) mutes its line drivers (606, 616) for the respective period to offload the line and reduce or eliminate the transmission noise injection into its line receivers (608, 614). Conversely, during the transmission period for each BBS module (602, 604), the line receivers (606, 616) are muted or placed in high-Z state to offload the single communication link 622 and keep the matching/impedance presented to the transmission line substantially constant (e.g. 75 or 50 Ohms for coaxial cable). This helps reduce the triple-transit echo and improves the link margin.

Figure 7A:
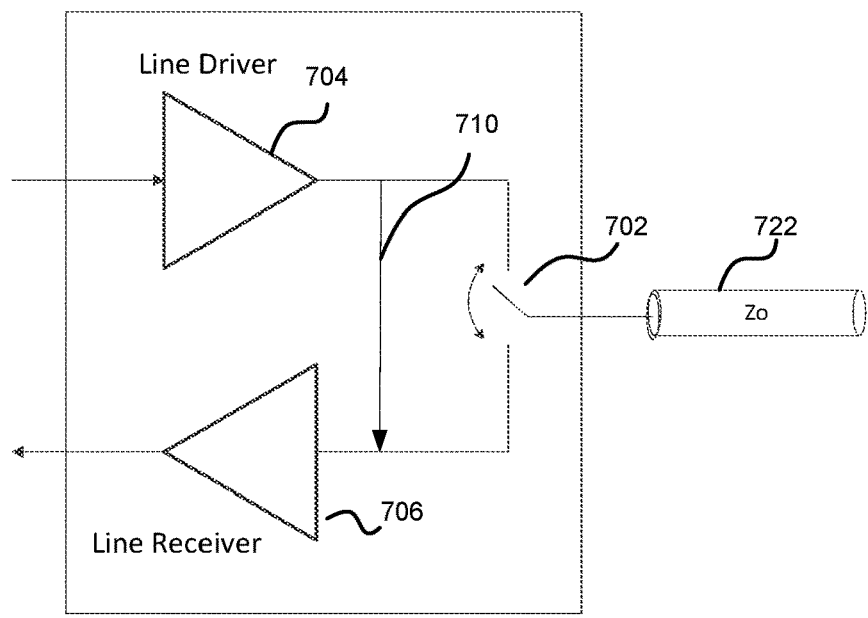
FIG. 7A is a block diagram that illustrates a post-driver loopback from a line driver to a line receiver, according to certain aspects of the present disclosure.

FIG. 7A is a block diagram that illustrates a post-driver loopback from the line driver 704 to the line receiver 706 according to certain aspects of the disclosure.

In certain embodiments, when the line driver 704 is driving the signal, the line receiver 706 is logically or physically disconnected from the single communication link. In such embodiments, the line receiver 706 can drift out of phase relative to the line driver 704 since the line receiver 706 is idling. Aspects of the disclosure disclose feeding back the baseband signal from the line driver 704 to the line receiver 706 using a loopback. In FIG. 7A, the loopback signal traverses the signal path 710 post line driver 704 back to the line receiver 706, even when the line receiver 706 is disconnected from the single communication link 722 via the switch 702. In certain embodiments, the loopback is only active when the node (i.e., line driver 704) is transmitting data over the single communication link 722.

Although FIG. 7A shows a direct signal path between the line driver 704 and the line receiver 706, in some implementations, additional circuitry may be included to selectively transmit data, portions of the data, or a derived pulse to the line receiver 706 or only allow transmitting of the data to the line receiver 706 for portions of the transmission period, such as the end of the transmission period so that the line receiver 706 can relock/retrain its phase based on the line driver 704 signal before receiving data from the single communication link 722.

Figure 7B:
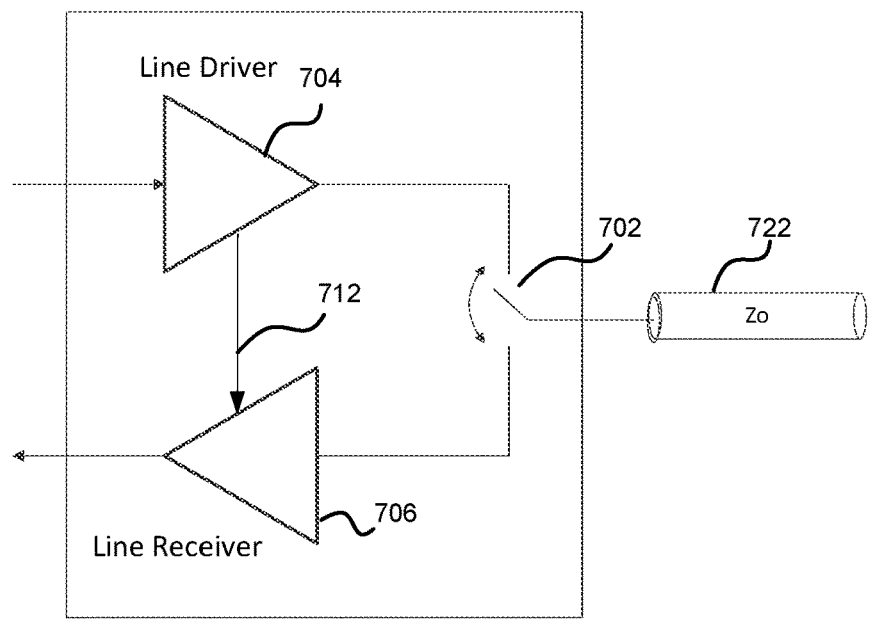
FIG. 7B is a block diagram that illustrates another implementation of a loopback from the line driver to the line receiver according to certain aspects of the present disclosure.

FIG. 7B is a block diagram that illustrates another implementation of the loopback from the line driver to the line receiver according to certain aspects of the disclosure. In FIG. 7B, the line driver 704 may drive the signal over a bypass signal path 712 to the line receiver 706 in the digital domain instead of the analog domain, as discussed with respect to FIG. 7A.

The techniques discussed for post-driver loopback (from FIG. 7A) or the pre-driver loopback (from FIG. 7B) may be utilized in any of the embodiments discussed previously, including the embodiments discussed with respect to FIG. 2, FIG. 3, FIG. 5 and FIG. 6.

Figure 8:
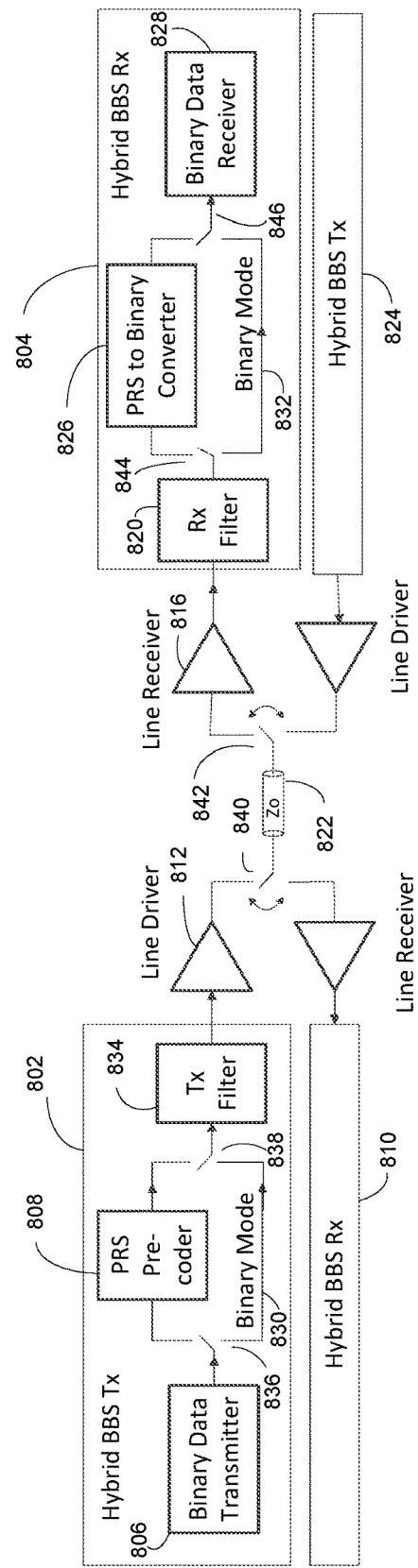
FIG. 8 is a block diagram illustrating certain components of a satellite user terminal for hybrid baseband signaling, according to certain aspects of the present disclosure.

FIG. 8 is a block diagram illustrating certain components of a satellite user terminal for hybrid baseband signaling, according to certain aspects of the disclosure. FIG. 8 illustrates two nodes, wherein the two nodes are capable of supporting two baseband signaling protocols, such as Non-Return to Zero (NRZ) and Partial Response Signaling (PRS) based protocol. Although NRZ and PRS are discussed, other baseband signaling protocols such as Pulse Amplitude Modulation (PAM) based protocol may also be used. At least in one embodiment, the BBS module may select another baseband signaling protocol for transmitting and receiving data between the nodes over the single communication link 822, and switch to using the selected baseband signaling protocol for transmitting and receiving data. As shown in FIG. 8, the hybrid BBS transmitter (Tx) 802 and the Hybrid BBS Tx 824 have similar components and functionality. Similarly, the hybrid BBS receiver (Rx) 804 and the hybrid BBS Rx 810 have similar components and functionality.

The binary data transmitter 806 transmits the binary data for transmission during the allocated transmission period. In one embodiment, the selection of the baseband signaling protocol from the PRS mode and Binary mode 830 is accomplished by the switches 836 and 838. In certain embodiments, the control logic previously discussed controls the switch 836. The control logic also controls switch 838, such that the switch 836 and switch 838 are selected to facilitate the same baseband signaling protocol. If PRS is selected, the PRS pre-decoder 808 converts the signal from binary to PRS before feeding the signal to the transmit (Tx) filter 834. On the other hand, if the Binary mode 830 is selected, the binary signal from the binary data transmitter 806 bypasses additional processing 808 before reaching the Tx filter 834.

The Tx filter 834 may provide pre-emphasis functionality and the Rx filter 820 may provide receive-end equalization to achieve a desired spectral profile end-to-end, including the single communication link 822. The desired profile can be achieved with filter only on one end (with the filter on the opposite end omitted), or on both ends, in which case the profile contribution and the response is partitioned between the two ends. Each of these filters may have fixed and/or programmable functionality.

In NRZ mode, the desired end-to-end spectral profile is flat response. However, in PRS mode, the desired profile may have a certain roll-off in the response with increasing frequency. Therefore, the communication link's profile may depend on the communication link length, the frequency of the signal and the baseband signaling protocol used. The communication link's roll-off may increase both with length and frequency.

In one embodiment, the Tx filter 834 adjusts its response to match the line and provide the optimum spectral profile, where the spectral profile may be measured at the receiving end and the receiver reports the measurement results back to the transmitting end. In certain embodiments, the Tx filter's 834 response may be adjusted during the calibration phase. Furthermore, since the initial profile may not be optimal, a more robust communication may be used with redundant transmission and/or slower rate to ensure the measurement data is conveyed successfully. Based on the reported profile by the receiving end, the control logic at the transmitting node computes the optimal filter coefficients and programs the Tx filter 834 accordingly. The optimal profiles are different for NRZ and PRS, so the node may select the target profile depending on the selected baseband signaling protocol.

In one embodiment, the receiver, based on its measurement of the profile, programs its own filter for optimal profile. In one embodiment, both ends adjust the profile for optimal link profile, where the receiving end measures the initial response, and the difference from the target response is partitioned between the Rx filter 820 and Tx filter 834. In one embodiment, the difference is split equally between the Rx filter 820 and Tx filter 834. In another embodiment, the partitioning is optimized to achieve optimal bit error rate (BER) and/or frame error rate (FER).

The Tx filter 834 uses the profile for the selected baseband signaling protocol and conditions the signal. The line driver 812 drives the signal over the single communication link 822. The control logic for the transmitting node in FIG. 8 selects the switch 840 such that the line driver 812 is electrically coupled to the single communication link 822. Also, the control logic for the receiving node in FIG. 8 selects the switch 842 such that the line receiver 816 is electrically coupled to the single communication link 822. The Rx filter 820 filters the received signal according to the selected baseband signaling protocol. Furthermore, the switches 844 and 846 are also selected by the control logic of the receiving node based on the selected signaling protocol. If the binary mode 832 is selected, the signal bypasses additional processing 826 and is received at the binary data receiver 828. However, if PRS is selected, then the PRS to binary converter 826 coverts the signal to binary and feeds it to the binary data receiver 828. As disclosed with respect to FIG. 8, line driver and transmitter may be used interchangeably without deviating from the scope of the disclosure. Similarly, line receiver and receiver may also be used interchangeably without deviating from the scope of the disclosure.

A number of different schemes may be used in selecting the baseband signaling protocol, without deviating from the scope of the disclosure. For example, in one embodiment, NRZ is selected as the default baseband signaling protocol and the system initializes in this mode. If the link is not established in a predetermined time upon initialization (e.g., upon power-up), the node may switch to the PRS mode. In another embodiment, the nodes test if NRZ mode can be used after establishing the link in PRS mode. In certain embodiments, the leader node conveys to the follower node to switch to NRZ mode after a specified time period. After such time period, the leader node also switches to NRZ and if the link is established in a predetermined time, both nodes remain in NRZ mode, otherwise they revert back to PRS and remain in PRS mode.

In one embodiment, the baseband signaling protocol is switched based on one or more signal quality parameters detected on the single communication link 822, such as one or more of error rate, signal-to-noise ratio, signal level, and spectral profile. In certain embodiments, the signal quality parameters are affected by length of the single communication link 822. In one embodiment, the BER and/or FER are measured at the receiving node, and if the error rate exceeds a pre-programmed threshold, the receiving node indicates to the transmitting node to switch to another baseband signaling protocol. For example, if the nodes were operating in NRZ mode, the nodes may switch to using PRS and vice-versa.

In another embodiment, the signal level may be used as the criteria for baseband signaling protocol selection. For example, upon initialization, the leader node may transmit using NRZ and the follower node measures the received level. If the level is lower than a predetermined threshold at the follower node, the follower node chooses the PRS mode. On the other hand, if the level is above the threshold, the follower node selects the NRZ mode. Once the link is established, the nodes may remain in NRZ mode and continue communicating in this mode. However, if after a predetermined time the link is not established, the leader may switch to PRS mode and the link establishes in this mode and if no link is established after a predetermined time, the whole process may be repeated.

In yet another embodiment, if the link is not established or if it is lost, each node switches the mode at random intervals, tries to establish the link, and if unsuccessful in a predetermined time, the node switches to another mode and repeats the process continually until the link is established.

Figure 9:
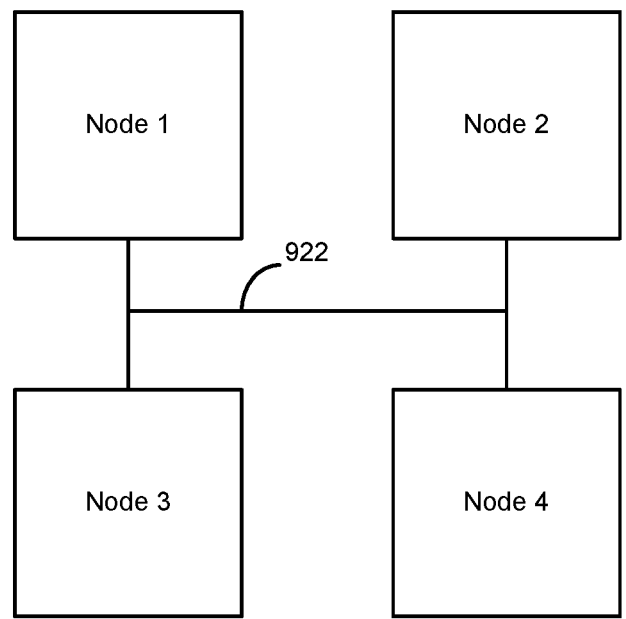
FIG. 9 is a block diagram of a multi-node system using a managed time division duplexed baseband signaling protocol across a single communication link, according to certain aspects of the present disclosure.

FIG. 9 illustrates a block diagram of a multi-node system with more than two nodes, wherein the nodes are communicating with each other using a single communication link. Specifically, FIG. 9 discloses a system with Node 1, Node 2, Node 3 and Node 4, all electronically coupled to the single communication link 922. Although FIG. 9 discloses four nodes, any number of nodes may be used in such a multi-node system. Each node may have circuitry similar to the circuitry discussed with reference to FIGS. 2-8 for transmitting and receiving data. Such a multi-node system can use any of the techniques previously disclosed with respect to FIGS. 2-8 for communicating using a managed time division duplexed baseband signaling protocol. In certain embodiments, one of the nodes may be pre-determined to be the leader node, while the other nodes may be follower nodes. In such scenarios, where one of the multiple nodes is the leader node, the protocols discussed with respect to FIG. 4A and FIG. 4B may be used in managing the transmission periods for each node for transmitting data. In certain embodiments, an adaptive management protocol may be used, similar to FIG. 4C, where none of the nodes are designated as leader nodes and every node determines its own transmission period. In such a scenario, a number of well-known fairness algorithms may be used in appropriately providing each node with access to the single communication link for transmitting data.

Figure 10A:
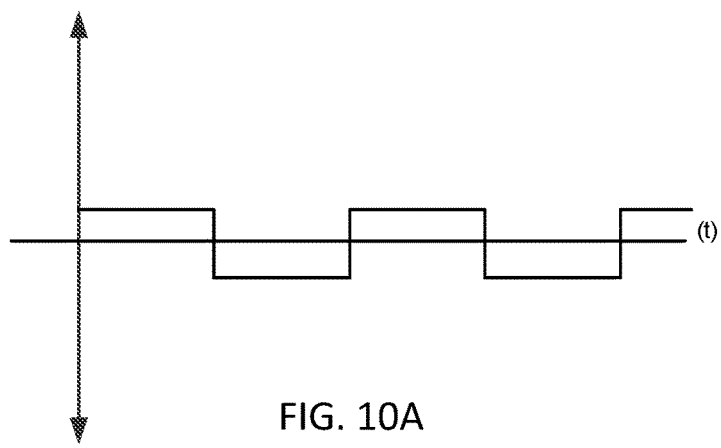
FIG. 10A, FIG. 10B and FIG. 10C illustrate bias shifting of the voltage across the single communication link between multiple nodes, according to certain aspects of the present disclosure.
Figure 10B:
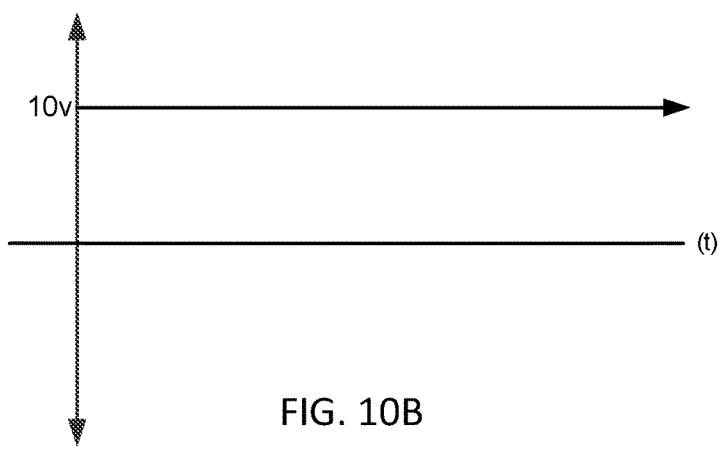
Figure 10C:
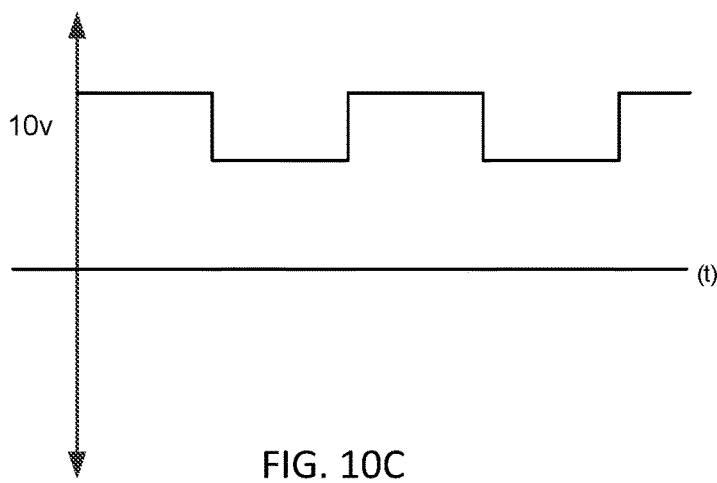

FIG. 10A, FIG. 10B and FIG. 10C together illustrate bias shifting of the voltage across the communication link between multiple nodes. In certain embodiments, one node may power another node through the single communication cable. For example, in a satellite user system, in certain embodiments, the indoor unit may power the outdoor unit through the single communication link, enabling both data communication (i.e., transmission and reception) and powering of the outdoor unit through a single communication link. In another embodiment, the powering may be reversed—the outdoor unit may provide power to the indoor unit and other devices (e.g. if the outdoor unit includes solar panels for power).

In one embodiment, the power supply voltage may be injected from the indoor unit into the cable via a bias-tee or diplexer to provide power to the outdoor unit. In one embodiment, a direct current (DC) power inserter is diplexed (via diplexer) into the line from the indoor unit side, providing power to the outdoor unit. The direct current (DC) coupling bandwidth may be kept low, minimizing the impact on the spectral shape of the baseband signal. In another embodiment, the coupling bandwidth may be wider, but the baseband signaling is pre-emphasized to compensate for the associated roll-off.

FIG. 10A illustrates an example NRZ signal for an example bit pattern to be transmitted from the indoor unit to the outdoor unit. FIG. 10B illustrates example DC voltage that is to be transmitted to the outdoor unit from the indoor unit for powering the outdoor unit. In one implementation, DC voltage may be combined with the NRZ signal using a bias-tee, resulting in a bias shifted signal shown in FIG. 10C. In one implementation, the bit pattern may be encoded using a Serial Gigabit Media Independent Interface (SGMII) allowing for some data error correction needed for correcting the errors introduced by bias shifting the bit pattern.

Figure 11:
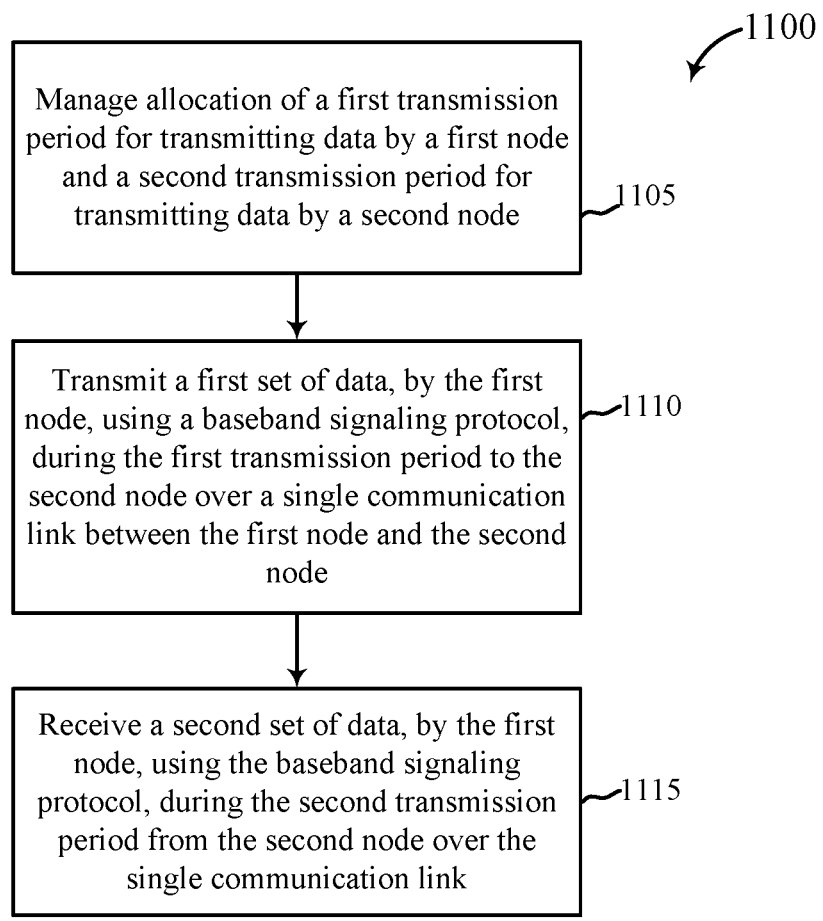
FIG. 11 is a flow chart illustrating an example of a method for communicating between multiple nodes, in accordance with various aspects of the present disclosure.

FIG. 11 is a flow chart illustrating an example of a method 1100 for facilitating communication between multiple nodes using a single communication link. In certain embodiments, the method facilitates communication between the indoor unit and outdoor unit of a satellite user terminal using a single communication link. For clarity, the method 1100 is described below with reference to aspects of one or more devices and/or components described with reference to FIGS. 1-10 and FIG. 13.

It should be noted that the method 1100 is just one implementation and that the operations of the method 1100 may be rearranged or otherwise modified such that other implementations are possible.

At block 1105, components of at least one node from a plurality of nodes manage allocation of a first transmission period for transmitting data by a first node and a second transmission period for transmitting data by a second node. In certain embodiments, the baseband signaling protocol may be one of Non-Return to Zero (NRZ), Partial Response Signaling (PRS) based protocol or Pulse Amplitude Modulation (PAM) based protocol.

In certain embodiments, at least one node is the leader node and the other nodes are the follower nodes, wherein the at least one node manages the allocation of the transmission periods.

In certain other embodiments, the nodes perform adaptive management of transmission periods, wherein each of the nodes manages the allocation of their respective transmission periods for transmitting. In certain embodiments, the nodes manage the allocation of their said respective transmission periods by sending one or more control characters with the transmission of their respective sets of data indicating completion of the transmission. In certain embodiments, the transmission periods are always smaller than a maximum transmission period. In other words, the first transmission period and the second transmission period are smaller than a pre-determined transmission period. In certain embodiments, the first transmission period and the second transmission period may be different from each other, and so may any of the subsequent transmission periods be different from each other.

In certain embodiments, components of the at least one node are configured to manage the allocation by performing one or more of synchronizing time between the nodes, determining a transmission schedule, transmitting the transmission schedule, managing switchover time, managing switchover direction, or responding to reservation requests or any combination thereof.

At block 1110, components of the first node transmit a first set of data, using a baseband signaling protocol, during the first transmission period to the second node over a single communication link between the plurality of nodes. A set of data may refer to a one or more units of data, wherein each unit of data may be a plurality of bits and may be organized in bytes, words, doublewords, etc. During the first transmission period, the second node may receive the first set of data transmitted by the first node using the baseband signaling protocol over the single communication link.

At block 1115, components of the first node receive a second set of data, using the baseband signaling protocol, during the second transmission period from the second node over the single communication link. During the second transmission period, the second node may transmit the second set of data that is received by the first node using the baseband signaling protocol over the single communication link.

In certain embodiments, the nodes may also implement loopback functionality so that the receiver circuitry does not drift out of phase. For example, the transmitter associated with the first node may also transmit the first set of data to the receiver of the first node during the first transmission period.

In certain embodiments, a frequency reference associated with the first baseband signaling module and a frequency reference associated with the second baseband signaling module is frequency locked. A frequency reference may refer to a fixed frequency from which operational frequencies may be derived or with which they may be compared. In certain embodiments, a reference clock associated with the first baseband signaling module and a reference clock associated with the second baseband signaling module is phase locked. A reference clock may refer to a fixed clock from which operational clocks may be derived or with which they may be compared. Phase locking two reference clocks may refer to synchronizing and/or maintaining the synchronization of the two clocks such that that they operate at the same phase or an acceptable deviation in phase from each other at any given point in time.

In certain embodiments, a system such as a satellite user terminal may include multiple nodes, wherein the first node is the indoor unit and the second node is an outdoor unit. The indoor unit may include a first baseband signaling module and the outdoor unit may include a second baseband signaling module. In one implementation, the first baseband signaling module and the second baseband signaling module may be responsible for managing the transmission periods and transmitting and receiving data using the baseband signaling protocol.

In certain embodiments, the indoor unit may further include a router for routing the first set of data and the second set of data between an user device and the satellite user terminal.

In certain other embodiments, the outdoor unit may further include a satellite modem configured to modulate the first set of data being sent to a satellite and demodulate the second set of data received from the satellite. The outdoor unit may further include a radio frequency (RF) communication unit configured to wirelessly transmit the first set of data to a satellite through an antenna.

In certain embodiments, the indoor unit provides power to the outdoor unit through the single communication link.

Figure 12:
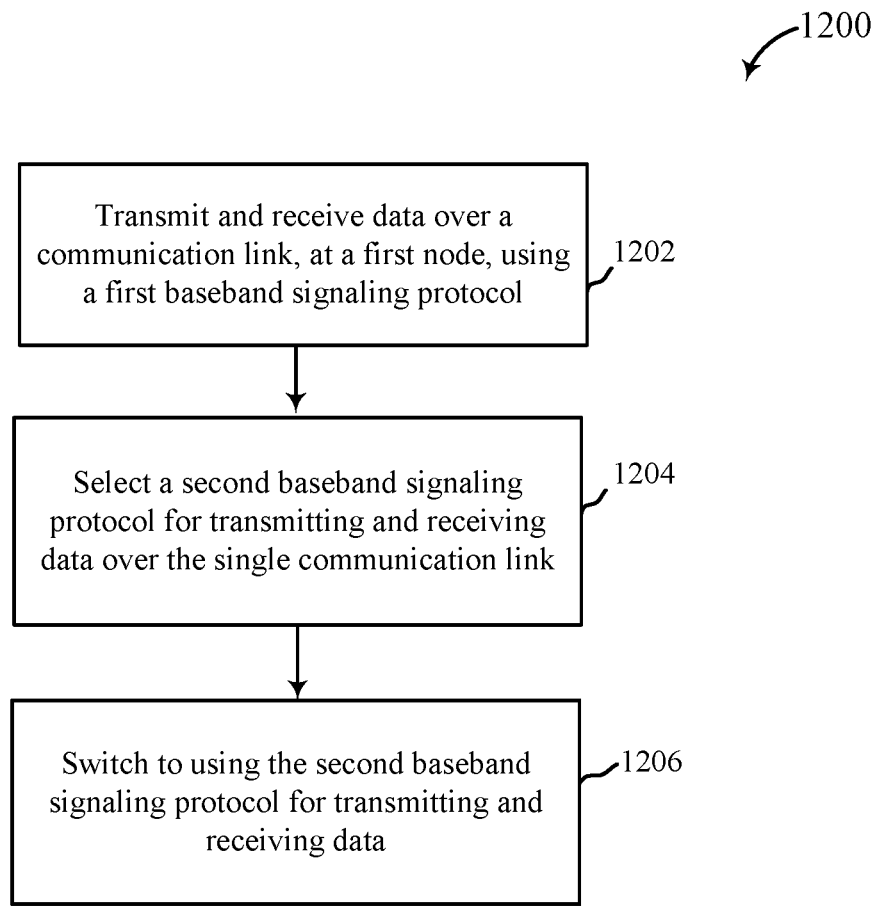
FIG. 12 is another flow chart illustrating an example of a method for communicating between multiple nodes, in accordance with various aspects of the present disclosure.

FIG. 12 is a flow chart illustrating an example of a method 1200 for hybrid baseband signaling between multiple nodes. In certain embodiments, the method facilitates selecting between multiple baseband signaling protocols. For clarity, the method 1100 is described below with reference to aspects of one or more devices and/or components described with reference to FIGS. 1-10 and FIG. 13.

It should be noted that the method 1200 is just one implementation and that the operations of the method 1200 may be rearranged or otherwise modified such that other implementations are possible.

At block 1202, in one embodiment, components of the at least one node from a plurality of nodes transmit and receive data over a single communication link using a first baseband signaling protocol.

At block 1204, components of the at least one node select a second baseband signaling protocol for transmitting and receiving data over the communication link. In certain embodiments, the second baseband signaling protocol is selected based on one or more signal quality parameters detected on the single communication link. The signal quality parameters may include one or more of error rate, signal-to-noise ratio, signal level, and spectral profile. In certain embodiments, the signal quality parameters may also be affected by length of the single communication link. In certain embodiments, the first baseband signaling protocol and the second baseband signaling protocol are each one of Non-Return to Zero (NRZ), Partial Response Signaling (PRS) based protocol or Pulse Amplitude Modulation (PAM) based protocol. As described in FIG. 8, the second baseband signaling protocol may be selected by coordinating the switch with the other nodes.

At block 1206, components of the at least one node switch to using the second baseband signaling protocol for transmitting and receiving data. In one embodiment, the switch may be performed by the control logic in the nodes using control signals to manipulate the switch to select one out of a plurality of baseband signaling protocols. Additional circuitry may be included for implementing each of the baseband signaling protocols.

In certain embodiments, a system such as a satellite user terminal may include multiple nodes, wherein the first node is the indoor unit and the second node is an outdoor unit. The indoor unit may include a first baseband signaling module and the outdoor unit may include a second baseband signaling module. In one implementation, the first baseband signaling module and the second baseband signaling module may be responsible for managing the transmission periods and transmitting and receiving data using the baseband signaling protocol.

In some examples, aspects from two or more of the methods of 1100 or 1200 may be combined. It should be noted that the methods of 1100 and 1200 are just example implementations and that the operations of the methods of 1100 and 1200 may be rearranged or otherwise modified such that other implementations are possible.

Figure 13:
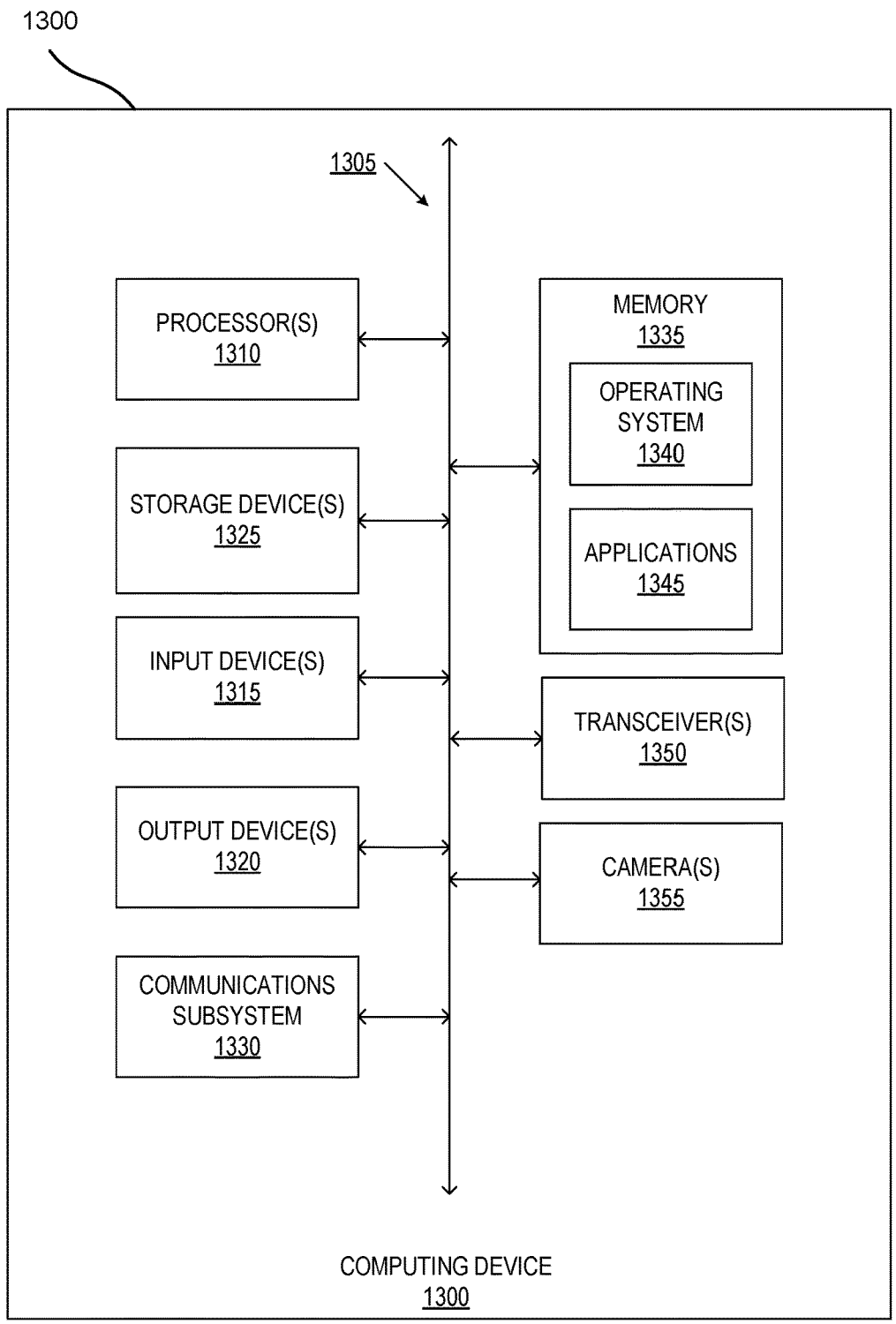
FIG. 13 is a block diagram of a computing device according to some embodiments.

Having described multiple aspects, an example of a computing system in which various aspects of the disclosure may be implemented will now be described with respect to FIG. 13. According to one or more aspects, a computer system as illustrated in FIG. 13 may be incorporated as part of the one or more nodes discussed previously. In some embodiments, the system 1300 is configured to implement any of the methods described above. FIG. 13 provides a schematic illustration of one embodiment of a computer system 1300 that can perform the methods provided by various other embodiments, as described herein, and/or can function as the outdoor unit, indoor unit or internal component of the such device. FIG. 13 is meant only to provide a generalized illustration of various components, any and/or all of which may be utilized as appropriate. FIG. 13, therefore, broadly illustrates how individual system elements may be implemented in a relatively separated or relatively more integrated manner.

The computer system 1300 is shown comprising hardware elements that can be electrically coupled via a bus 1305 (or may otherwise be in communication, as appropriate). The hardware elements may include one or more processors 1310, including without limitation, one or more general-purpose processors and/or one or more special-purpose processors (such as digital signal processing chips, graphics acceleration processors, and/or the like); one or more input devices 1315, which can include without limitation a wireless receivers, wireless sensors, a mouse, a keyboard and/or the like; and one or more output devices 1320, which can include without limitation a display unit, a printer and/or the like. Furthermore, the hardware elements may also include one or more cameras 1355 for obtaining image data.

In some embodiments, the one or more processor 1310 may be configured to perform a subset or all of the functions described above with respect to FIG. 13. The processor 1310 may comprise a general processor and/or an application processor, for example. In some embodiments, the processor is integrated into an element that processes visual tracking device inputs and wireless sensor inputs.

The computer system 1300 may further include (and/or be in communication with) one or more non-transitory storage devices 1325, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 1300 might also include a communications subsystem 1330, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1330 may permit data to be exchanged with a network (such as the network described below, to name one example), other computer systems, and/or any other devices described herein. In many embodiments, the computer system 1300 will further comprise a non-transitory working memory 1335, which can include a RAM or ROM device, as described above. In some embodiments, communications subsystem 1330 may interface with transceiver(s) 1350 configured to transmit and receive signals from access points or mobile devices. Some embodiments may include a separate receiver or receivers and a separate transmitter or transmitters.

The computer system 1300 also can comprise software elements, shown as being currently located within the working memory 1335, including an operating system 1340, device drivers, executable libraries, and/or other code, such as one or more application programs 1345, which may comprise computer programs provided by various embodiments, and/or may be designed to implement methods, and/or configure systems, provided by other embodiments, as described herein. Merely by way of example, one or more procedures described with respect to the method(s) discussed above, for example, and as described with respect to FIG. 13, might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1325 described above. In some cases, the storage medium might be incorporated within a computer system, such as computer system 1300. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1300 and/or might take the form of source and/or installable code, which, upon compilation and/or installation on the computer system 1300 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 1300) to perform methods in accordance with the disclosure. For example, some or all of the procedures of the described methods may be performed by the computer system 1300 in response to processor 1310 executing one or more sequences of one or more instructions (which might be incorporated into the operating system 1340 and/or other code, such as an application program 1345) contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein, for example, methods described with respect to FIG. 13.

The terms "machine-readable medium" and "computer-readable medium," as used herein, refer to any medium that participates in providing data that causes a machine to operate in a specific fashion. In an embodiment implemented using the computer system 1300, various computer-readable media might be involved in providing instructions/code to processor(s) 1310 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1325. Volatile media include, without limitation, dynamic memory, such as the working memory 1335. Transmission media include, without limitation, coaxial cables, copper wire and fiber optics, including the wires that comprise the bus 1305, as well as the various components of the communications subsystem 1330 (and/or the media by which the communications subsystem 1330 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, solid state disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1300. These signals, which might be in the form of electromagnetic signals, acoustic signals, optical signals and/or the like, are all examples of carrier waves on which instructions can be encoded, in accordance with various embodiments of the invention.

The communications subsystem 1330 (and/or components thereof) generally will receive the signals, and the bus 1305 then might carry the signals (and/or the data, instructions, etc. carried by the signals) to the working memory 1335, from which the processor(s) 1310 retrieves and executes the instructions. The instructions received by the working memory 1335 may optionally be stored on a non-transitory storage device 1325 either before or after execution by the processor(s) 1310. Memory 1335 may contain at least one database according to any of the databases and methods described herein. Memory 1335 may thus store any of the values discussed in any of the present disclosures, including FIGS. 1, 2, 3, 4, 5, 6, 7, 8, 9, 10, 11, 12 and related descriptions.

The methods described in FIG. 11 and FIG. 12 may be implemented by various blocks in FIG. 13. For example, processor 1310 may be configured to perform any of the functions of blocks in flowchart 1100 and flowchart 1200. Storage device 1325 may be configured to store an intermediate result, such as a globally unique attribute or locally unique attribute discussed within any of blocks mentioned herein. Storage device 1325 may also contain a database consistent with any of the present disclosures. The memory 1335 may similarly be configured to record signals, representation of signals, or database values necessary to perform any of the functions described in any of the blocks mentioned herein. Results that may need to be stored in a temporary or volatile memory, such as RAM, may also be included in memory 1335, and may include any intermediate result similar to what may be stored in storage device 1325. Input device 1315 may be configured to receive wireless signals from satellites and/or base stations according to the present disclosures described herein. Output device 1320 may be configured to display images, print text, transmit signals and/or output other data according to any of the present disclosures.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Features described with respect to certain embodiments may be combined in various other embodiments. Different aspects and elements of the embodiments may be combined in a similar manner Technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. A number of steps may be undertaken before, during, or after the above elements are considered. Accordingly, the above description does not limit the scope of the disclosure.

Various examples have been described. These and other examples are within the scope of the following claims.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The invention claimed is:

1. A satellite user terminal comprising:
   an indoor unit comprising a first baseband signaling module; and
   an outdoor unit comprising a second baseband signaling module,
      wherein the second baseband signaling module is communicatively coupled to the first baseband signaling module using a single communication link between the indoor unit and the outdoor unit,
      wherein at least one baseband signaling module from the first baseband signaling module and the second baseband signaling module is further configured to manage allocation of a first transmission period for transmitting data by the first baseband signaling module and a second transmission period for transmitting data by the second baseband signaling module, and
      wherein the first baseband signaling module comprises:
         a transmitter to transmit a first set of data, using a baseband signaling protocol, during the first transmission period to the second baseband signaling module over the single communication link,
         a receiver to receive a second set of data, using the baseband signaling protocol, during the second transmission period from the second baseband signaling module over the single communication link,
         the transmitter of the first baseband signaling module is further to transmit the first set of data over the single communication link without a carrier signal.

2. The satellite user terminal of claim 1, wherein the second baseband signaling module comprises:
   a receiver to receive the first set of data, using the baseband signaling protocol, during the first transmission period from the first baseband signaling module over the single communication link; and
   a transmitter to transmit the second set of data, using the baseband signaling protocol, during the second transmission period to the second baseband signaling module over the single communication link.

3. The satellite user terminal of claim 1, wherein each of the first baseband signaling module and the second baseband signaling module manage the allocation of their respective transmission periods for transmitting.

4. The satellite user terminal of claim 1, wherein each of the first baseband signaling module and the second baseband signaling module adaptively manage the allocation of their said respective transmission periods.

5. The satellite user terminal of claim 1, wherein each of the first baseband signaling module and the second baseband signaling module adaptively manage the allocation of their said respective transmission periods by sending one or more control characters with the transmission of their respective sets of data indicating completion of the transmission.

6. A satellite user terminal comprising:
an indoor unit comprising a first baseband signaling module; and
an outdoor unit comprising a second baseband signaling module,
wherein the second baseband signaling module is communicatively coupled to the first baseband signaling module using a single communication link between the indoor unit and the outdoor unit,
wherein at least one baseband signaling module from the first baseband signaling module and the second baseband signaling module is further configured to manage allocation of a first transmission period for transmitting data by the first baseband signaling module and a second transmission period for transmitting data by the second baseband signaling module, and
wherein the first baseband signaling module comprises:
a transmitter to transmit a first set of data, using a baseband signaling protocol, during the first transmission period to the second baseband signaling module over the single communication link, and
a receiver to receive a second set of data, using the baseband signaling protocol, during the second transmission period from the second baseband signaling module over the single communication link,
wherein the transmitter for the first baseband signaling module is further configured to:
determine that transmission of the first set of data requires transmission time greater than a pre-determined maximum transmission period; and
stop transmission of the first set of data beyond the pre-determined maximum transmission period.

7. The satellite user terminal of claim 1, wherein the first transmission period is different from the second transmission period.

8. The satellite user terminal of claim 1, wherein the transmitter of the first baseband signaling module is further configured to transmit the first set of data to the receiver of the first baseband signaling module during the first transmission period.

9. A satellite user terminal comprising:
an indoor unit comprising a first baseband signaling module; and
an outdoor unit comprising a second baseband signaling module,
wherein the second baseband signaling module is communicatively coupled to the first baseband signaling module using a single communication link between the indoor unit and the outdoor unit,
wherein at least one baseband signaling module from the first baseband signaling module and the second baseband signaling module is further configured to manage allocation of a first transmission period for transmitting data by the first baseband signaling module and a second transmission period for transmitting data by the second baseband signaling module, and
wherein the first baseband signaling module comprises:
a transmitter to transmit a first set of data, using a baseband signaling protocol, during the first transmission period to the second baseband signaling module over the single communication link, and
a receiver to receive a second set of data, using the baseband signaling protocol, during the second transmission period from the second baseband signaling module over the single communication link,
wherein the at least one baseband signaling module is selected as a leader, wherein the leader manages allocation of transmission periods for communication over the single communication link.

10. The satellite user terminal of claim 1, wherein a frequency reference associated with the first baseband signaling module and a frequency reference associated with the second baseband signaling module are frequency locked.

11. The satellite user terminal of claim 1, wherein a reference clock associated with the first baseband signaling module and a reference clock associated with the second baseband signaling module are phase locked.

12. The satellite user terminal of claim 1, wherein the baseband signaling protocol is a first baseband signaling protocol and the at least one baseband signaling module is further configured to:
select a second baseband signaling protocol for transmitting and receiving data between the first baseband signaling module and the second baseband signaling module over the single communication link; and
switch to using the second baseband signaling protocol for transmitting and receiving the data.

13. The satellite user terminal of claim 12, wherein the second baseband signaling protocol is selected based on one or more signal quality parameters detected on the single communication link.

14. The satellite user terminal of claim 13, wherein the signal quality parameters include one or more of error rate, signal-to-noise ratio, signal level, and spectral profile.

15. The satellite user terminal of claim 13, wherein the signal quality parameters are affected by length of the single communication link.

16. The satellite user terminal of claim 12, wherein the first baseband signaling protocol and the second baseband signaling protocol are each one of Non-Return to Zero (NRZ), Partial Response Signaling (PRS) based protocol or Pulse Amplitude Modulation (PAM) based protocol.

17. The satellite user terminal of claim 1, wherein the indoor unit further comprises a router for routing the first set of data and the second set of data between a user device and the satellite user terminal.

18. The satellite user terminal of claim 1, wherein the outdoor unit further comprises a satellite modem configured to modulate the first set of data being sent to a satellite and demodulate the second set of data received from the satellite.

19. The satellite user terminal of claim 1, wherein the outdoor unit further comprises a radio frequency (RF) communication unit configured to wirelessly transmit the first set of data to a satellite through an antenna.

20. The satellite user terminal of claim 1, wherein the indoor unit provides power to the outdoor unit through the single communication link.

21. A method for communicating between an indoor unit and an outdoor unit of a satellite user terminal (SUT), comprising:

managing, using at least one baseband signaling module from a first baseband signaling module and a second baseband signaling module, allocation of a first transmission period for transmitting data by the first baseband signaling module and a second transmission period for transmitting data by a second baseband signaling module, wherein the indoor unit comprises the first baseband signaling module and the outdoor unit comprises the second baseband signaling module;

transmitting a first set of data, by the first baseband signaling module, using a baseband signaling protocol, during the first transmission period to the second baseband signaling module over a single communication link between the indoor unit and the outdoor unit; and receiving a second set of data, by the first baseband signaling module, using the baseband signaling protocol, during the second transmission period from the second baseband signaling module over the single communication link, wherein the transmitting the first set of data comprises transmitting the first set of data over the single communication link without a carrier signal.

22. The method of claim 21, comprising:

receiving the first set of data, by the second baseband signaling module, using the baseband signaling protocol, during the first transmission period from the first baseband signaling module over the single communication link; and transmitting the second set of data, by the second baseband signaling module, using the baseband signaling protocol, during the second transmission period to the second baseband signaling module over the single communication link.

23. The method of claim 21, further comprising:

selecting another baseband signaling protocol for transmitting and receiving data between the first baseband signaling module and the second baseband signaling module over the single communication link; and switching to using the selected baseband signaling protocol for transmitting and receiving the data.

24. A method for communicating between an indoor unit and an outdoor unit of a satellite user terminal (SUT), comprising:

managing, using at least one baseband signaling module from a first baseband signaling module and a second baseband signaling module, allocation of a first transmission period for transmitting data by the first baseband signaling module and a second transmission period for transmitting data by a second baseband signaling module, wherein the indoor unit comprises the first baseband signaling module and the outdoor unit comprises the second baseband signaling module;

transmitting a first set of data, by the first baseband signaling module, using a baseband signaling protocol, during the first transmission period to the second baseband signaling module over a single communication link between the indoor unit and the outdoor unit;

receiving a second set of data, by the first baseband signaling module, using the baseband signaling protocol, during the second transmission period from the second baseband signaling module over the single communication link;

determining that transmission of the first set of data requires transmission time greater than a pre-determined maximum transmission period; and stopping transmission of the first set of data beyond the pre-determined maximum transmission period.

25. A method for communicating between an indoor unit and an outdoor unit of a satellite user terminal (SUT), comprising:

managing, using at least one baseband signaling module from a first baseband signaling module and a second baseband signaling module, allocation of a first transmission period for transmitting data by the first baseband signaling module and a second transmission period for transmitting data by a second baseband signaling module, wherein the indoor unit comprises the first baseband signaling module and the outdoor unit comprises the second baseband signaling module;

transmitting a first set of data, by the first baseband signaling module, using a baseband signaling protocol, during the first transmission period to the second baseband signaling module over a single communication link between the indoor unit and the outdoor unit;

receiving a second set of data, by the first baseband signaling module, using the baseband signaling protocol, during the second transmission period from the second baseband signaling module over the single communication link;

selecting the at least one baseband signaling module as a leader; and managing with the leader allocation of transmission periods for communication over the single communication link.

26. The method of claim 21, wherein the receiving the first set of data comprises receiving the first set of data over the single communication link without a carrier signal.

27. The satellite user terminal of claim 1, wherein the receiver of the second baseband signaling module is further to receive the first set of data over the single communication link without a carrier signal.

* * * * *